US009142945B2

(12) United States Patent
Snyker et al.

(10) Patent No.: US 9,142,945 B2
(45) Date of Patent: Sep. 22, 2015

(54) ELECTRICAL FEED-THROUGH SPACER AND CONNECTIVITY

(71) Applicant: SAGE Electrochromics, Inc., Faribault, MN (US)

(72) Inventors: Mark O. Snyker, Apple Valley, MN (US); Jean-Christophe Giron, Edina, MN (US); Bryan D. Greer, Northfield, MN (US); Jerome Korus, Lakeville, MN (US); Rino Messere, Modave (BE); Cliff Taylor, Northfield, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 184 days.

(21) Appl. No.: 13/910,911

(22) Filed: Jun. 5, 2013

(65) Prior Publication Data

US 2013/0319756 A1      Dec. 5, 2013

Related U.S. Application Data

(60) Provisional application No. 61/655,738, filed on Jun. 5, 2012.

(51) Int. Cl.
*H02G 3/22* (2006.01)
*E06B 3/667* (2006.01)
*G02F 1/161* (2006.01)

(52) U.S. Cl.
CPC  *H02G 3/22* (2013.01); *E06B 3/667* (2013.01); *G02F 1/161* (2013.01)

(58) Field of Classification Search
CPC ............. H02G 3/22; H02G 3/24; H02G 3/26; H02G 3/28; H02G 3/286; H02G 3/30; H02G 3/36; B60R 16/0207; B60R 16/0215; E06B 3/667; E06B 3/6675; G02F 1/161
USPC ............ 174/650, 262, 72 A, 73.1, 77 R, 68.1, 174/68.3, 652, 138 G, 360; 248/49, 68.1, 248/56; 428/34, 192; 361/302, 306.1
See application file for complete search history.

(56) References Cited

U.S. PATENT DOCUMENTS 3,379,859 A    4/1968  Marriott
3,760,157 A    9/1973  Newman et al.

(Continued)

FOREIGN PATENT DOCUMENTS

EP      1538877 A1    6/2005
WO   2012171844 A1   12/2012

OTHER PUBLICATIONS

International Search Report and Written Opinion for Application No. PCT/US2013/044355 dated Dec. 13, 2013.

*Primary Examiner* — Angel R Estrada
(74) *Attorney, Agent, or Firm* — Abel Law Group, LLP; Robert N Young

(57) ABSTRACT

An insulated glazing unit is provided. The unit includes a spacer frame separating a pair of substrates. The spacer frame has a length and a width transverse to the length. The unit further includes a conductive element passing through the width of the spacer frame. The unit further includes a first conductive component within the spacer frame. The first conductive component is in electrical communication with the conductive element. The conductive element is adapted for electrical communication with a second conductive component on a side of the width of the spacer frame opposite the first conductive component.

19 Claims, 15 Drawing Sheets

(56) References Cited

U.S. PATENT DOCUMENTS

| | | | |
|---|---|---|---|
| 4,306,140 A | | 12/1981 | Stromquist |
| 4,613,530 A | * | 9/1986 | Hood et al. .................. 174/360 |
| 5,270,518 A | * | 12/1993 | Naoumenko et al. ......... 428/192 |
| 6,633,004 B1 | * | 10/2003 | Heitz et al. ................ 174/138 G |
| 6,787,204 B2 | * | 9/2004 | Chaussade et al. ............. 428/34 |
| 8,373,067 B2 | * | 2/2013 | Derda et al. ................. 174/68.1 |
| 2006/0240686 A1 | | 10/2006 | Jiten |
| 2007/0204531 A1 | | 9/2007 | Gerhardinger et al. |
| 2013/0157493 A1 | | 6/2013 | Brown |
| 2014/0099826 A1 | | 4/2014 | Mueller et al. |

* cited by examiner

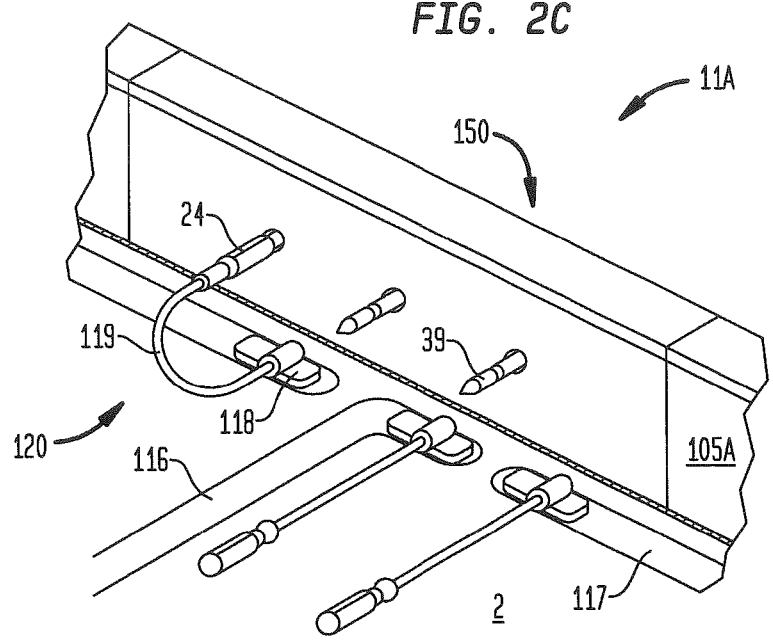
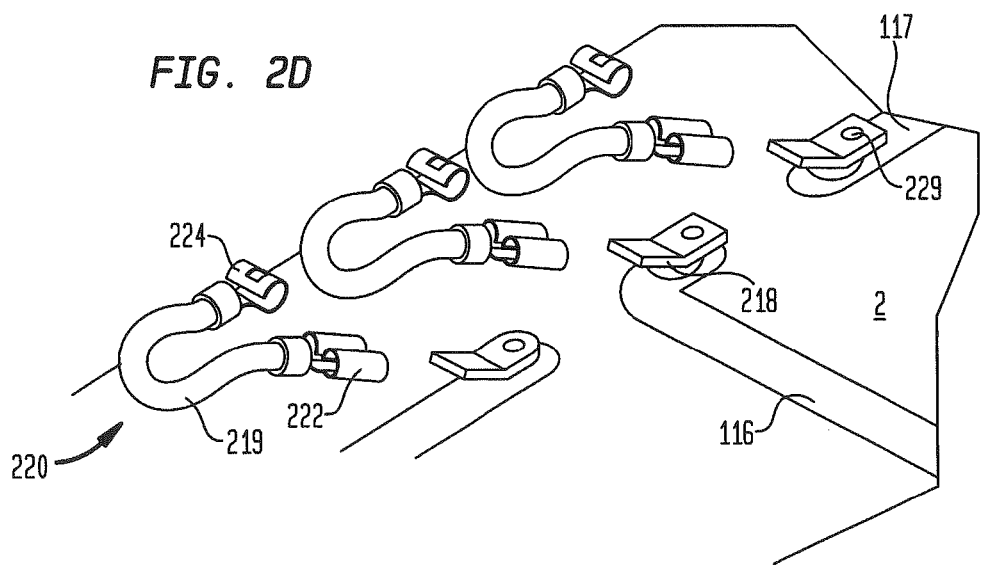

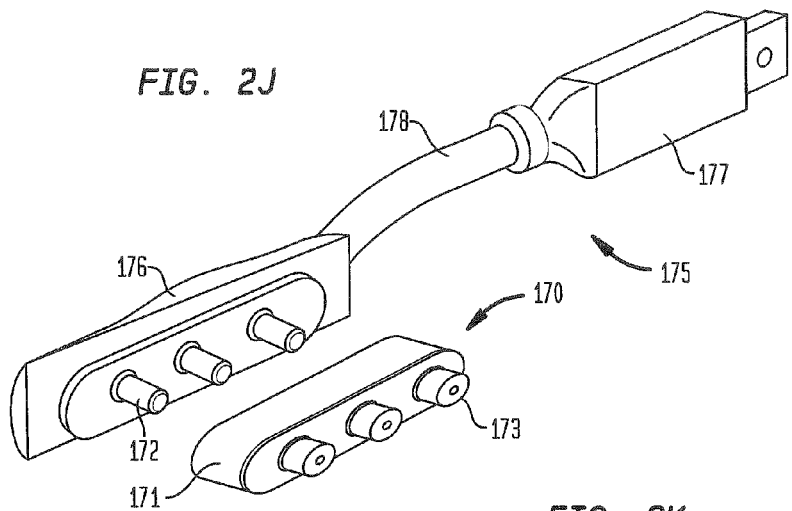
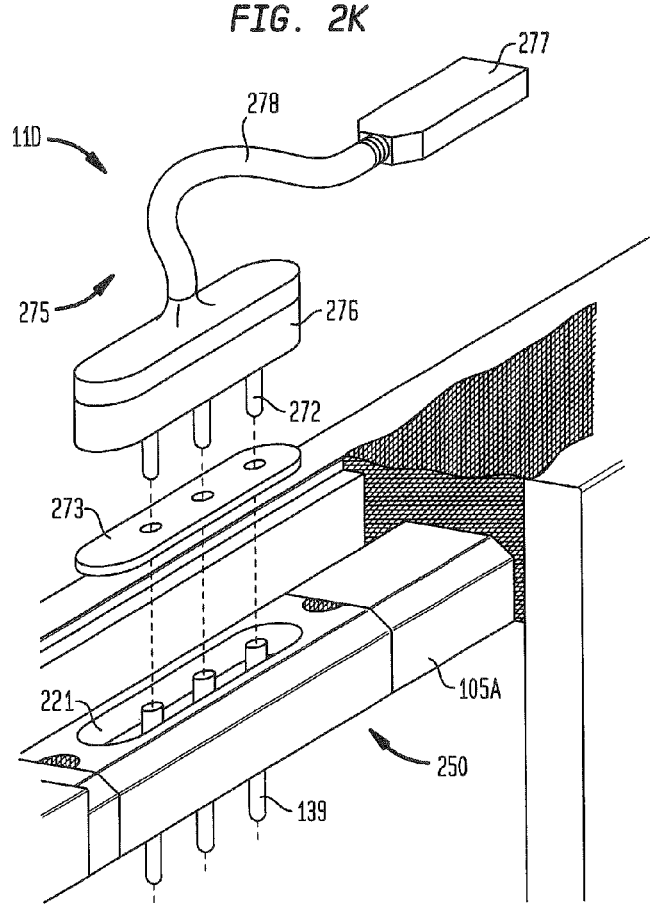

ELECTRICAL FEED-THROUGH SPACER AND CONNECTIVITY

CROSS-REFERENCE TO RELATED APPLICATIONS

The present application claims the benefit of the filing date of U.S. Provisional Patent Application No. 61/655,738 filed Jun. 5, 2012, the disclosure of which is hereby incorporated herein by reference.

BACKGROUND OF THE INVENTION

Insulated glazing units ("IGU"), as that term is used herein, means two or more layers of glass, which are sometimes called glass lite panels, separated by a spacer frame along the edge and sealed to create a dead air (or other gas, e.g., argon, nitrogen, krypton) space between the layers. The spacer frame includes spacers, which are conventionally hollow tubes, also called spacer tubes, of a conductive material, such as but not limited to aluminum or steel, but which may not be hollow in some instances and which may be made of polymeric materials. The spacer frame, in some instances, may include a spacer key, which is sometimes called a spacer connector, that is inserted into ends of spacers to bridge the ends together. The spacer keys conventionally have the same outer profile as the ends of the spacers and may be hollow or solid like the corresponding spacers with which they interface. Active glazings, which form a part of the IGU and which include electrochromic glazings, may be applied or deposited to one of the glass lite panels. An electrochromic glazing, may have a laminate structure (see copending U.S. Patent Application Publication Nos. 2011/0261429 A1 and 2011/0267672 A1 and copending U.S. patent application Ser. Nos. 13/906,456 and 13/906,487, the disclosures of which are hereby incorporated by reference herein in their entireties). For example, the electrochromic glazings may include a series of thin films that are applied or deposited to one of the glass lite panels. Electrochromic glazings or coatings include electrochromic materials that are known to change their optical properties in response to the application of an electric potential which can create coloration or tinting within the electrochromic glazings. Common uses for these glazings include architectural windows, as well as windshields and mirrors of automobiles. Further details regarding the formation of IGUs can be found in, for example, U.S. Pat. Nos. 7,372,610 and 7,593,154, the entire disclosures of which are hereby incorporated by reference herein in their entireties.

As known to those of ordinary skill in the art, electrically conductive busbars are typically applied along the surface of one of the glass lite panels such that upon assembly of an IGU, the busbars are either outside an IGU spacer/polyisobutylene ("PIB") seal, or "spacer seal" as that term is used herein, forming an IGU thermal break cavity or mainly inside the spacer seal. For example, as shown in FIG. 1, an IGU 1 may have a glass panel 2 on which a busbar 3 is applied such that the busbar 3 is mainly within a perimeter defined by sides of a spacer 5 and a spacer seal 4 placed between the spacer 5 and the glass panel 2 having approximately the same perimeter as the spacer 5. As shown, in such a configuration, the busbar 3 must be applied to extend under the spacer seal 4 to a region outside the perimeters of the spacer seal 4 and the spacer 5 to allow for the formation of a busbar solder tab 7 on an end of the busbar 3 that provides a contact area to which a wire 9 can be soldered to provide a sufficient solder joint 8 for a consistent electrical connection. The busbar solder tab 7 must be placed such that there is sufficient clearance between the solder joint 8 and the spacer 5 to prevent electrical shorting due to undesired contact between the spacer 5 and the solder joint 8 during the assembly process or during slight movements that may occur over the useful life of the IGU. In addition, sufficient clearance is needed to provide space for a solder gun tip to land and create a solder joint and, in some instances, to permit the addition of a sealant onto the busbar and busbar solder tab after soldering to either or both prevent solder tab corrosion and prevent argon or other inert gases from exiting a cavity of the IGU defined by the spacer 5 and the spacer seal 4 as well as the spacer seal 14 opposing the spacing seal 4.

To provide sufficient clearance, the spacer 5 has been dimensioned to have a smaller perimeter than IGUs that do not require electrical connectivity. However, in certain architectural frame configurations, one or both of the smaller perimeter spacer and corresponding spacer seal is visible within the viewable area of the frame unless an obscuration mask is applied, such as described in U.S. patent application Ser. No. 13/797,610, the entire disclosure of which is hereby incorporated by reference herein, which may be used to improve the aesthetic look of such an architectural glazing frame system but which may add cost while still causing a reduction in the viewable area of the frame as compared to IGUs not requiring electrical connectivity.

Thus, there exists a need for an electrical interconnection to busbars in an IGU cavity without requiring a reduction in the perimeter of a spacer to accommodate for such a connection.

BRIEF SUMMARY OF THE INVENTION

In an aspect in accordance with an embodiment, an electrical feed-through allows for contact, and thus electrical interconnection, between an electrical source or component to a busbar within an IGU cavity that may be defined by a spacer frame. The spacer frame may preferably include a spacer. In some arrangements, the spacer may be made of materials such as but not limited to aluminum, steel, stainless steel, copper, beryllium copper, brass, tin, nickel, silver, titanium, nickel titanium, and other rigid metals, plastics, or blends of plastics or polymers. The spacer preferably may be non-permeable or substantially non-permeable. In some arrangements, the spacer may be electrically conductive. In some arrangements, materials of components of the assembly for the feed-through has a composition and density to prevent penetration of rare gases and moisture. In some arrangements, such contact may be achieved through a contact clip type connector assembly. In some arrangements, such contact may be achieved through either or both of more conventional heat and sonic soldering techniques, which may be performed prior to closure of the IGU when the busbars are accessible. In some arrangements, the contact to the busbar may be achieved through inductive soldering or laser soldering or a gold puff type of contact, which may be performed after the IGU is closed and which may be performed after the IGU is sealed.

In some arrangements, the feed-through may include an at least electrically insulative component, which may be a spacer key. In some arrangements, the materials for the spacer key may be selected from any of nylons (polyamide or a material blend with a polyamide); NORYL (polyphenylene ether or a blend with either or both of a polyphenylene ether and polystyrene); fluoropolymers such as PVDC (polyvinylidene chloride), PCTFE (polychlorotrifluoroethylene), ECTFE (ethylene-chlortrifluoroethylene), PVF (polyvinyl fluoride), PVC (polyvinylchloride), PFA (perfluoroalkoxy fluorocarbon), and PVDF (polyvinylidene fluoride);

TEONEX (polyethylene naphthalate); polyacrylonitrile; PPA (polyphthalamide); PAI (polyamide-imide); PEI (polyetherimide); MYLAR (polyethylene terephthalate); PBT (polybutylene terephthalate); TPU (theremoplastic polyurethane); plastic blends; pyrex or gorilla glass; ceramics such as alumina ceramics, alumina nitride, steatite ceramics such as a magnesium silicate; and metal (aluminum, steel, stainless steel, etc.) which may include an electrically insulative coating.

In an aspect in accordance with an embodiment, an insulated glazing unit, which may be an electrochromic device, may include a conductor that may pass through a center or central region of a spacer frame. The conductor may be made of, but is not limited to being made of a flexible fine gauge wire, pin, or flat strip, flat tab and which may be made of, but is not limited to being made of metal or a conductive polymer. The conductor may be in electrical communication with at least one busbar. The conductor may be insulated from the spacer frame or conductive portions of the spacer frame.

In an aspect in accordance with an embodiment, an insulated glazing unit, which may be an electrochromic device, may include a spacer frame separating a pair of substrates. The spacer frame may have a length and may have a thickness transverse to the length. The insulated glazing unit may include at least one conductive element that may pass through the width of the spacer frame. The insulated glazing unit may include at least one first conductive component within the spacer frame. Any of the first conductive components may be in electrical communication with a corresponding one of the conductive elements. Any of the conductive elements may be adapted for electrical communication with a second component, which may be a conductive component, on a side of the width of the spacer frame opposite the side of the first conductive component.

In some arrangements, the first component may be a conductive coil. In some arrangements, the conductive coil may curl in both clockwise and counterclockwise directions. In some arrangements, the conductive coil may have a straight portion soldered or otherwise attached to a busbar within a perimeter of the spacer frame. In some arrangements, the conductive coil may curl within a plane parallel to the length of the spacer frame. In some arrangements, the conductive coil may curl within a plane perpendicular to the length of the spacer frame. In some arrangements, the conductive coil may pass through the spacer frame.

In some arrangements, the conductive element may be a first pin. In some such arrangements, the conductive coil may be a spring attached at a first end to the first pin. In some such arrangements, the conductive coil may be in electrical communication with a busbar within a perimeter of the spacer frame.

In some arrangements, the insulated glazing unit may include a second pin that may have a head. The insulated glazing unit may have a pad extending from the spacer frame within the perimeter of the spacer frame in which the pad may have a receiving hole, tab, or slot feature. In some such arrangements, the second pin may extend from the busbar through the receiving hole of the pad. In some such arrangements, the spring may be coiled around the second pin to aid in maintaining a shape and a position of the spring. In some arrangements, a cover may cover the conductive pins.

In some arrangements, the first conductive component may be soldered to a busbar within a perimeter of the spacer frame. In some arrangements, the insulated glazing unit may include a cover that may at least partially enclose or cover one of any of the conductive elements and that may at least partially enclose or cover any of the first conductive components. In some such arrangements, the cover may be within a perimeter of the spacer frame.

In some arrangements, an insulative tube may extend across and may extend through the width of the spacer frame. In some arrangements, the insulative tube may surround or may enclose at least one of the conductive elements.

In some arrangements, the spacer frame may include a spacer and an insulative element that may separate the pair of substrates. In some such arrangements, the insulative element may separate conductive spacer ends of the spacer.

In an aspect in accordance with an embodiment, a system for providing an electrical interface across a sealed boundary of an insulated glazing unit, which may be an electrochromic device, may include a spacer frame that may have a length and that may have a thickness transverse to the length. The thickness of the spacer frame may separate a pair of substrates along the length of the spacer frame and may form a portion of the sealed boundary. The spacer frame further may have a width transverse to the length. The insulated glazing unit may have at least one conductive element passing through the sealed boundary. The insulated glazing unit may include first and second components on opposing sides of the width of the spacer frame. Either or both of the first and second components may be conductive components. Any of the conductive elements may be in electrical communication with either or both of the corresponding first and second components.

In some arrangements, the conductive element may pass through the spacer frame. In some arrangements, the conductive element may pass between the spacer and at least one of the pair of substrates. In some arrangements, the spacer frame may include a spacer and an insulative element that may separate the pair of substrates. The insulative element may separate conductive spacer ends of the spacer.

In some arrangements, the sealed boundary of the insulated glazing unit may include at least one seal that may separate the spacer frame from one of the pair of substrates. In some arrangements, the conductive element may pass through one of (i) any of such seals, (ii) a space between any of such seals and the spacer frame, and (iii) a space between any of such seals and the one of the pair of substrates.

In some arrangements, the conductive element may be a metallic band conforming to at least a wall of the spacer frame. The wall may define at least a portion of the width of the spacer frame. In some arrangements, the conductive element may be one of a flexible printed circuit and a flexible cable ribbon. In some of either such arrangements, the flexible printed circuit or the flexible cable ribbon may pass between the spacer and the one of the pair of substrates. In some other of either such arrangements, the flexible printed circuit or the flexible cable ribbon may extend between busbars within an IGU cavity that may be defined by a perimeter of the spacer frame and a conductive element passing through a spacer frame.

In some arrangements, the second component may be spaced from the spacer frame by a riser or portion of a riser that may be attached to the spacer frame and that may extend from the spacer frame. In some arrangements, the riser may include or enclose at least one electrical contact. In some such arrangements, any of such electrical contacts may be exposed for electrical interconnection with the second conductive component in which the second conductive component may be outside the perimeter of the spacer frame. In some arrangements, the riser may be an insulative pass-through for at least one electrical contact or connection to or from other components on opposing sides of the riser.

In some arrangements, the second component may include a redistribution structure that may either or both provide a central electrical connection with or distribute electrical current to one or more other components outside the perimeter of the spacer frame. In some arrangements, the second component may include a riser. In some arrangements, the redistribution structure may be attached to and may extend from the riser.

In an aspect in accordance with an embodiment, a method for providing an electrical interface across a sealed boundary of an insulated glazing unit, which may be an electrochromic device, may be provided. The method may include a step of receiving at least one conductive element through a sealed boundary of an insulated glazing unit. The insulating glazing unit may include a spacer frame that may have a length and that may have a width transverse to the length. The width of the spacer frame may separate a pair of substrates along the length of the spacer frame and may form a portion of the sealed boundary. The spacer frame may have a thickness transverse to the length. The method may include a step of receiving electrical current through any of the conductive elements at either of first and second components on opposing sides of the width of the spacer frame, in which either or both of the first and second components may be conductive.

In some arrangements, the insulated glazing unit may include at least one seal separating the spacer frame from one of the pair of substrates. Such a seal may form an additional portion of the sealed boundary. During the step of receiving any of the conductive elements, such conductive elements may be passed through any of the (i) spacer frame, (ii) the seal, (iii) a space between the seal and the spacer frame, and (iv) a space between the seal and the one of the pair of substrates.

In some arrangements, the spacer frame may include an insulative element and a spacer that may separate the pair of substrates. The insulative element may separate conductive spacer ends of the spacer. During the step of receiving any of the conductive elements, the conductive element may be passed one of (i) through the insulative element and (ii) around the insulative element such that the conductive element may conform to at least a wall of the insulative element. The wall of the insulative element may define at least a portion of the width of the insulative element.

BRIEF DESCRIPTION OF THE DRAWINGS

FIG. 2C is a perspective view of a portion of an IGU having an electrical feed-through interconnection through a spacer key of the IGU in accordance with an embodiment.

FIG. 2D is an exploded perspective view of connectors for use in an electrical feed-through interconnection through an IGU in accordance with an embodiment.

FIG. 2J is an exploded view of a riser and a corresponding redistribution connector in accordance with an embodiment.

FIG. 2K is an exploded view of a portion of a system for electrical feed-through interconnection through a spacer key of an IGU in accordance with an embodiment.

DETAILED DESCRIPTION

As used herein, the terms "width" and "length" refer to directions parallel to parallel surfaces of a substrate, such as a glass panel. The term "thickness" is used to refer to a dimension measured in a direction perpendicular to the parallel surfaces of such a substrate. The terms "rear" and "outer" refer to directions away from an IGU cavity and parallel to the direction of the width directions of features whereas the terms "front" and "inner" refer to directions towards the IGU cavity and parallel to the direction of the width directions of features.

Figure 1:
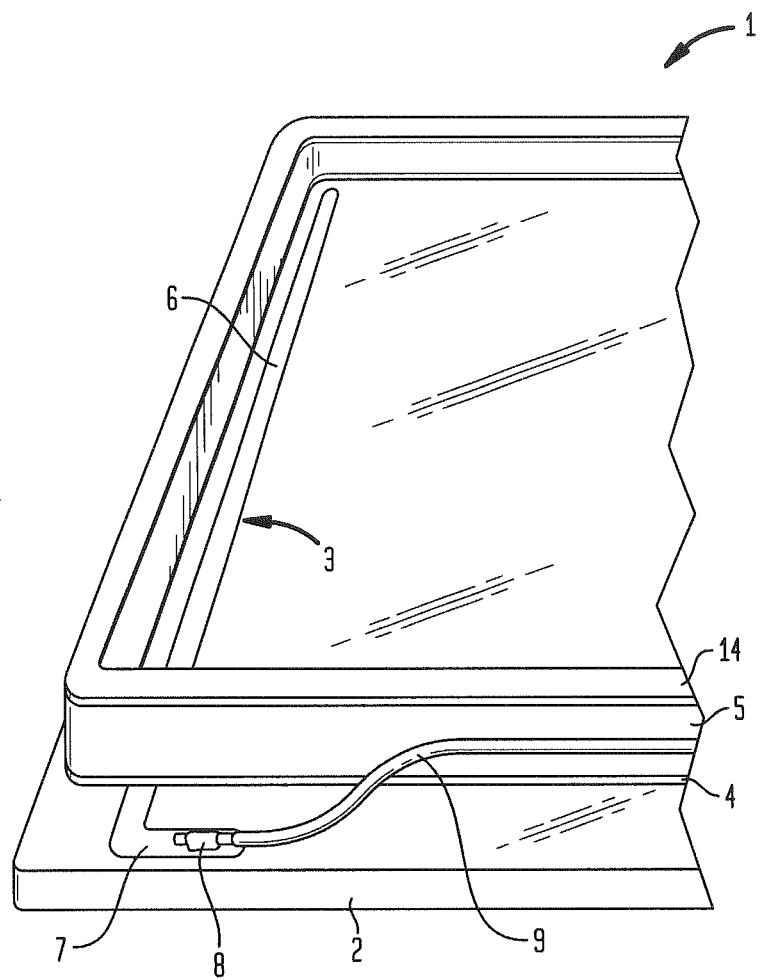
FIG. 1 is a perspective view of a portion of an IGU, as known in the prior art.
Figure 2A:
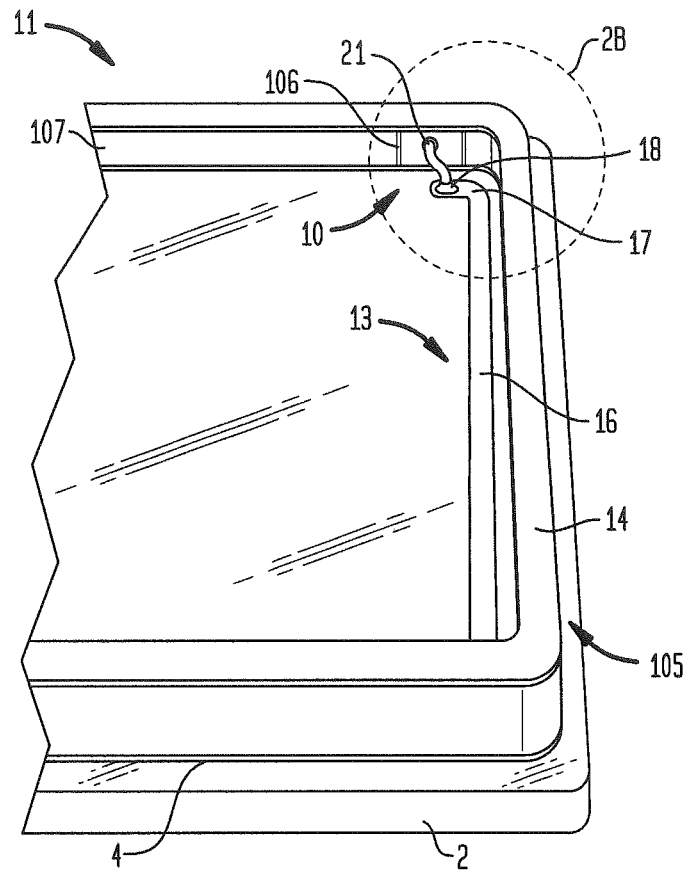
FIGS. 2A and 2B are perspective and expanded perspective views of a portion of an IGU having an electrical feed-through interconnection through a spacer frame of the IGU in accordance with an embodiment.
Figure 2B:
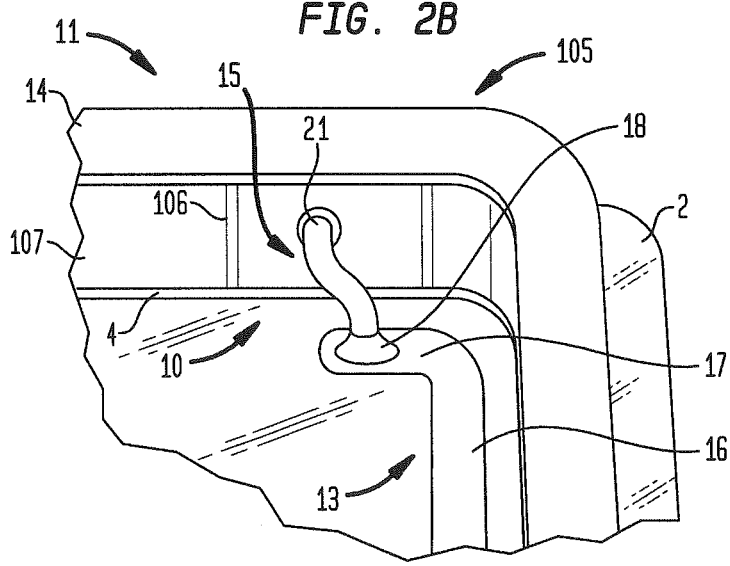

Referring now to the drawings, as shown in FIGS. 2A and 2B, an IGU 11 may include a spacer 105 and opposing spacer seals 4, 14 placed onto a substrate, such as a glass lite panel 2.

A spacer, such as the spacer 105, may form a portion of an overall spacer frame that may include other features such as but not limited to an insulative tube, an insulative element, or a spacer key as described further herein. The IGU 11 may include a busbar 13 applied along a length of a side of the spacer 105. The busbar 13 may have a main section 16 which, in conjunction with another busbar spaced apart from the busbar 13, passes an electrical current through electrochromic glazings applied to the glass lite panel 2. As best shown in FIG. 2B, the busbar 13 may include a busbar solder tab 18 to which a conductive element such as a wire 15 may be but is not limited to being attached at a solder joint 18. The wire 15 may be passed through a hole 21 through a thickness of the spacer 105 and may be attached to a conductive component outside of an outer surface 208 of the spacer 105. The wire may be made of conductive materials such as but not limited to stainless steel or titanium and may be made with or without either of conductive plating and anti-corrosion plating. In this manner, an electrical current may be supplied from outside of an IGU cavity, defined by an inner surface 207 of the spacer 105, to the busbar 13 which, in such a configuration, may be formed entirely within the IGU cavity. As shown, the hole 21 may be formed through a insulative tube 10 inserted within a tube space 106 defined by the spacer 105. In some arrangements, the spacer 105 may be made of electrically conductive materials such as but not limited to stainless steel and other materials as set forth previously herein. In some such arrangements, the insulative tube 10 may insulate the wire 15 from electrical interconnection with the spacer to prevent a shorting of an electrical current otherwise passing through the wire 15. In some arrangements, such as that shown in this example, the insulative tube 10 may be a spacer key, which may have similar features to other spacer keys described more fully herein (see, for example the description regarding the spacer key 450A of FIG. 5A) with respect to its interface with the corresponding spacer, such as the spacer 105 shown in this example.

A visible portion of the tube 10, such as the section of the tube 10 illustrated in FIGS. 2A and 2B, may have a variety of shapes including but not limited to having a cross-section of a circle, a rectangle such as in the example shown, a triangle, or an oval. The tube 10 may extend through all or a portion of the tube space 106. The insulative tube 10 may be made of insulating materials including electrically insulative polymers, such as PVDC, NORYL, and nylon, and ceramics, such as alumina ceramics and other materials as set forth previously herein. As shown in FIGS. 2A and 2B, the tube 10 may include a front plate that may have a surface that is flush with an inner surface 107 of the spacer 105 facing the IGU cavity. Such a front plate of the tube 10 may have tabs or clips (not shown) permitting the tube 10 to be snapped onto the inner surface 107 of the spacer 105. The spacer 105 may include a step inset from the inner surface 107 and within the space 106 for mating with an edge surface of the perpendicular to the front plate of the tube 10 and for providing a limit to the depth of insertion of the tube 10 within the spacer 105.

Figure 3A:
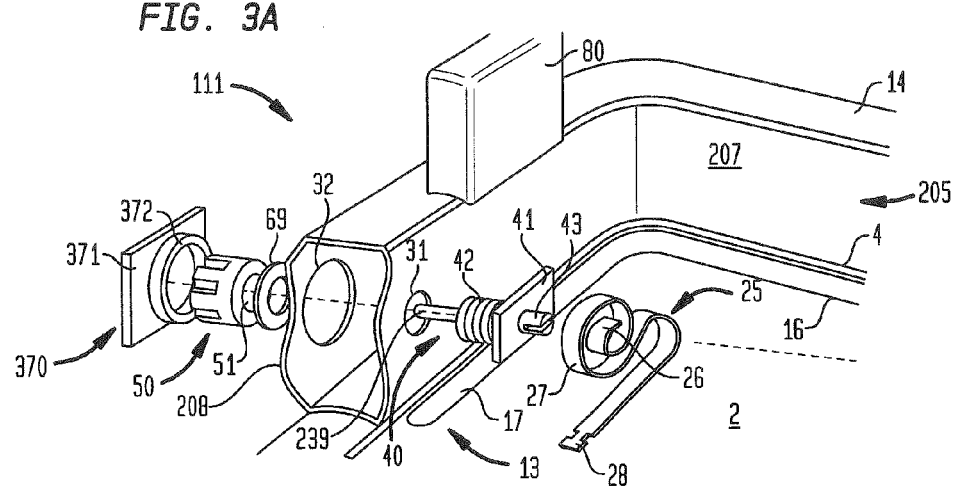
FIGS. 3A and 3B are perspective views of portions of IGUs having electrical feed-through interconnections through respective spacers of the IGUs in accordance with some embodiments.
Figure 3B:
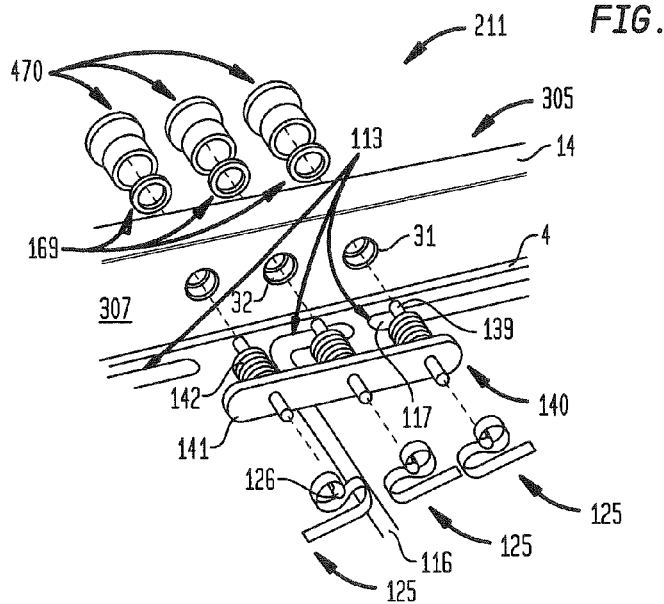

In some alternative arrangements, the tube 10 may have substantially the shape of the insulative tube 40, as further described herein with respect to FIGS. 3A and 3B, which may include a front plate 41 that may abut against the inner surface of the spacer. In some arrangements, the tube 10 may interface with but is not limited to interfacing with one or more of seals, couplings, and rear plates such as those further described with respect to FIGS. 3A and 3B. In some alternative arrangements, the wire may be in the form of a coil (not shown) to accommodate for relative movements among components of the IGU. Such a coiled wire may be a spring soldered on one end to the busbar 13 which passes through an insulative tube placed within the spacer.

Referring now to FIG. 2C, an IGU 11A may include a spacer key 150 inserted into a spacer 105A. The spacer key 150 may be solid or hollow. A plurality of conductive pins 39, or in some arrangements even a single pin, may extend through a width of the spacer 105A for electrical interconnection through the spacer 105A between electrical components within an IGU cavity, defined by an inner surface of the spacer 105A, and electrical components outside of the IGU cavity (not shown). As shown in this example, two outer pins 39 may be connected to respective outer busbars 117 applied along the glass lite panel 2 and an inner pin 39 may be connected to an inner busbar 116 through the use of respective connectors 120. The connectors 120 may include contacts 24 and wires 119. The wires 199 may extend on one end from the contacts 24 and may be coupled to contact pads 118 on an opposite end of the wires 119. In some arrangements, the contacts 24 may be but are not limited to being crimped, as shown, or soldered to the pins 39, or may act as clips for maintaining a connection with the pins. In some such arrangements, as shown, each of the contacts 24 may include two curved sections that are crimped toward each other and around the respective pins 39. In some arrangements, the wires 119 may be but are not limited to being crimped, as shown, within a central receiving section of the contact pads 118. In some arrangements, the wires 119 may be soldered to the busbars. In some arrangements, the wires 119 may be in many forms including but not limited to being any of solid wires, springs, and coiled wires. Either or both of the pins 39 and the wires 119 may be made of materials such as but not limited to any of stainless steel, copper, aluminum, and nickel titanium, or nitinol.

In an alternative arrangement to that shown in FIG. 2C, as illustrated in FIG. 2D, a plurality of connectors 220 may be attached to the pins 39 of the spacer key 150 and provide an electrical interconnection between the pins 39 and the inner and outer busbars 116, 117. As shown, in this example, contact pads 218 may be but are not limited to being attached by a fastener 229, as shown, soldered, or bonded through a conductive adhesive, to the respective inner and outer busbars 116, 117. As shown, an angled portion of the contact pads 218 may extend at an angle with the glass lite panel 2. Each of the connectors 220 may include a wire 219 extending between first and second contacts 222, 224. As shown, the angled portion of the contact pads 218 may be flat such that the first contact 222, which may be a crimped terminal as shown, may be slid onto the angled portion of the respective contact pad 218 in which the first contact 222 may connect around and onto the angled portion of the contact pads 218.

Figure 2E:
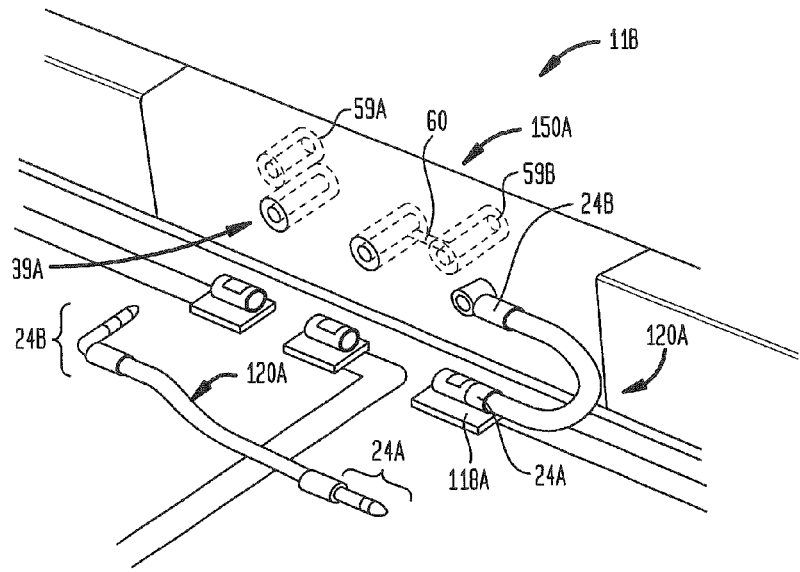
FIG. 2E is a perspective view of a portion of an IGU having an electrical feed-through interconnection through a spacer key of the IGU in accordance with an embodiment.

As illustrated in FIG. 2E, in another alternative arrangement to that shown in FIG. 2C, a plurality of connectors 120A, that may be jumper wires, may have first and second ends 24A, 24B that may be inserted into receptacles within contact pads 118A, in which such receptacles may be electronically conductive, and into conductive first receptacles 39A extending from the IGU cavity through a portion of the spacer key 150A. As shown, the first end 24A may include a straight head and the second end 24B of each of the connectors 120A may include a bent head, which may reduce bends in the connectors 120A when they are connected and reduce stresses imposed on the connectors. In some arrangements, the end 24B may have a 90 degree bend in the head. In some arrangements, the connectors 120A may be highly flexible 22 AWG wires that may be insulated as shown.

In some arrangements, the first receptacles 39A may be electrically connected to second receptacles, such as the optional spacer receptacles 59A and 59B shown as dashed lines in FIG. 2E, extending from an outer surface of the spacer key 150A through a portion of the spacer key 150A. As shown, the second receptacle 59A may physically contact the first receptacle 39A or may be electrically connected to the first receptacle 39A through an electrically conductive bridge 60. Connectors such as jumper wires and cables having male heads may then be received within the second receptacles 59A, 59B to electrically interconnect components external to the IGU to the busbars within the IGU cavity.

Figure 2F:
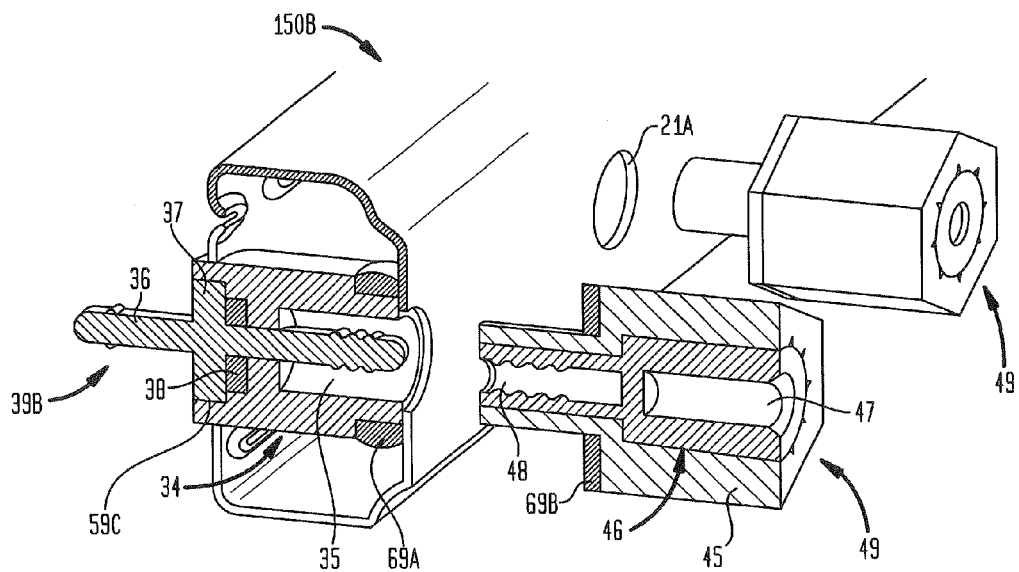
FIG. 2F is a cross-sectional perspective view of a portion of a spacer frame having an electrical feed-through interconnection through the spacer frame in accordance with an embodiment.

Referring now to FIG. 2F, in some arrangements, a plurality of receptacles 34 and corresponding pins 39B that may be located concentrically within the receptacle 34 may extend through a width of a spacer key 150B. Each pin 39B may include a shaft 36 surrounded by a flange 37 having a thickness located along a longitudinal axis of the pin 39B. Each receptacle 34 may have a first cavity 59C that may serve as an abutment for the flange 37 and which may be used to maintain a relative axial position of the pin 39B and the receptacle 34. As shown, one end of the shaft 36 of the pin 39B may extend into a second cavity 35 of the receptacle 34 such that an open space is defined between the shaft 36 and the second cavity 35. A seal 38 may be received within the first cavity 59C and may surround the shaft 36 of the pin 39B. As shown, the seal 38 may be received behind the flange 37 of the pin 39B against a base of the first cavity 59C. In this manner, the seal 38 may prevent leakage of gases and the introduction of moisture between the first and second cavities 35 and 59C.

As further shown in FIG. 2F, the spacer key 150B may include a plurality of holes 21A that may be aligned with the cavity 35 of a corresponding receptacle 34. An additional inner seal 69A may be seated between a step that may be formed around an end of each receptacle 34 and an interior wall of the spacer 150B such that the inner seal 69A surrounds the perimeter of the corresponding hole 21A.

Still referring to FIG. 2F, respective socket assemblies 49 may include a socket shell 45, which as shown may be insulative or non-conductive, and a socket pin 47 surrounded by the shell 45. In some arrangements, the socket pin 47 may be encased within the socket shell 45 such that an exterior surface of the socket pin 47 conforms to a bore extending through the socket shell 45. As shown, each of the socket assemblies 49 may include a narrow end that may be dimensioned to be inserted through the respective holes 21A and a wider end that may extend away from the spacer key 150B upon receipt of the narrow end into the spacer key 150B. The socket pin 47 may include outer and inner cavities 47, 48.

Upon insertion of the respective socket assembly 49 into the second cavity 35 of the receptacle 34, the socket pin 47 may be received between the shaft 36 of the pin 39B and the second cavity 35 of the pin 39B. Each of the pins 39B and the socket pin 47 may be made of conductive materials, such as but not limited to those described previously herein with respect to the pin 39. As shown, the socket assemblies 49 may be received through an outer surface of the spacer key 150B, and thus outside the perimeter of and outside an IGU cavity of a corresponding spacer frame (not shown). In this manner, upon interconnection between the pin 39B and a corresponding connector, such as but not limited to the connectors 120, 220 described previously herein, the socket assembly 49 may be electrically interconnected to a busbar within such an IGU cavity into which the spacer key 150B may be inserted.

A male connector (not shown), such as but not limited to an individual pin or a pin extending from a pigtail as shown and described further herein, may be inserted into the outer cavity 47 of a corresponding socket assembly 49. In this manner, components within an IGU cavity, such as busbars may be electrically interconnected to electrical components that are electrically interconnected with the socket assemblies 49 to redistribute electrical current to other locations of an IGU or to locations remote from the IGU. In some arrangements, a plurality of pins of a pigtail connector may be inserted into respective socket assemblies 49.

As further shown, an outer seal 69B may surround the narrow end at the intersection of the narrow and wider ends of each of the socket assemblies 49. Accordingly, when the socket assembly 49 is received within a corresponding hole 21A and into a corresponding receptacle 34, either or both of the inner and outer seals 69A, 69B may act to prevent leakage of gases from the IGU cavity and may act to prevent the intrusion of moisture into the IGU cavity.

Figure 2G:
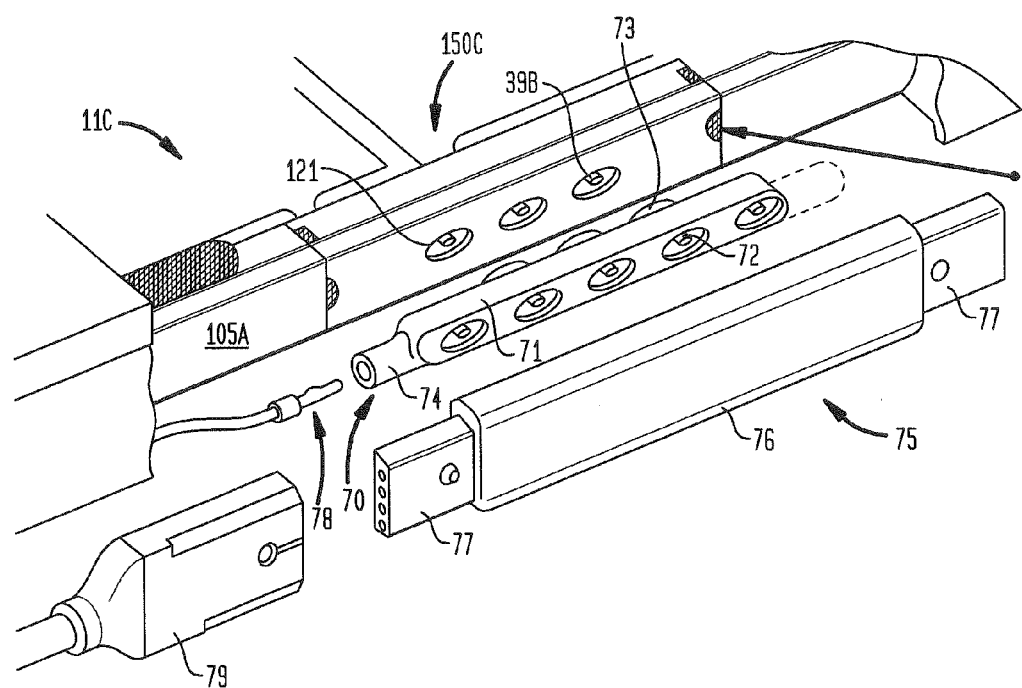
FIG. 2G is an exploded view of a portion of a system for electrical feed-through interconnection and distribution through a spacer key of an IGU in accordance with an embodiment.

As illustrated in the arrangement of FIG. 2G, the pins 39B of the IGU 11C may extend through holes 121 defined by the spacer key 150C. An elongated riser 70 may include extensions 73 extending from a body 71 of the riser 70 that may be dimensioned to fit within the respective holes 121 of the spacer key 150C such that a lower face of the riser 70 may be placed flush against an outer surface of the spacer key 150C. As shown, in some arrangements, a series of riser pins 72 may extend through respective cavities extending from an upper face opposite the lower face of the body 71 of the riser 70. As further shown, in some such arrangements, respective longitudinal axes of the riser pins 72 may extend in a direction parallel to respective longitudinal axes of the pins 39B. In some arrangements, the extensions 73 may include internal contacts (not shown) that may electrically interconnect the pins 39B and the riser pins 72 when the riser 70 is received within the space key 150C. In other arrangements, the pins 39B and the riser pins 72 may physically contact each other when the riser 70 is received within the spacer key 150C.

In the example shown, the riser 70 may have a width such that immediately following deposition of a secondary seal, such as but not limited to any of polyisobutylene (PIB), silicons, silicones including glazing silicone, and polyurethane, over an exterior surface of the spacer key 150C during assembly of the IGU 11B, the riser pins 72 may be exposed or at least easily accessible for interconnection with other electrical components upon removal of thin layer of the secondary seal, as described further herein. In this manner, a bottom face (not shown) of a redistribution connector 75 may be physically and electrically interconnected with the riser pins 72.

In some arrangements, as further shown in FIG. 2G, the redistribution connector 75 may be a printed circuit board connector that may include extensions that may be inserted within the holes defined by the body 71 of the riser 70. As in the example shown, the redistribution connector 75 may include a body 76, which may encapsulate a printed circuit board, between opposing conduits 77 for attachment to other connectors running from other electrical sources, such as the external connector 79 extending from a cable, as shown in FIG. 2G.

The riser 70 may include a transverse connector 74 that may extend in a direction perpendicular to the longitudinal axes of the riser pins 72 to provide an electrical interconnection with a cable 78 running parallel to the length of the spacer 105A and spacer key 150C, as further shown in FIG. 2G. In some arrangements, the cable 78 may provide an electrical interconnection between the riser 70 and another busbar besides the inner and outer busbars 116, 117 electrically connected to the spacer key 150C or to another spacer key or portion of a spacer of a spacer frame.

Figure 2H:
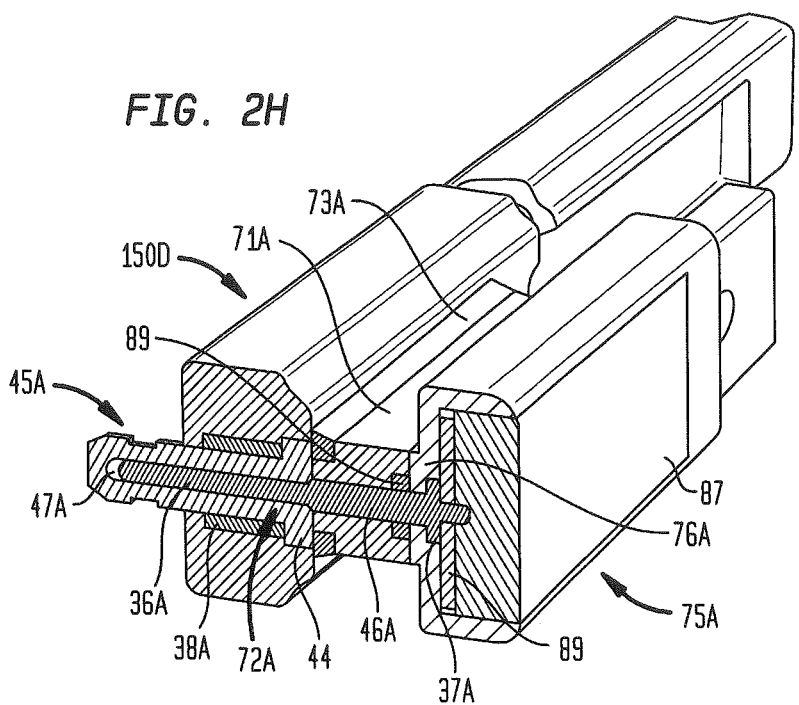
FIGS. 2H and 2I are cross-sectional perspective views of portions of respective systems for electrical feed-through interconnection and distribution through a spacer frame of an IGU in accordance with some embodiments.

As illustrated in FIG. 2H, in an alternative arrangement to that shown in FIG. 2G, a pin 72A may extend from a redistribution connector 75A through a riser 71A and may extend from the riser 71A through a spacer key 150D. The spacer 150D may include a spacer receptacle 45A extending from an outer surface of the spacer key 150D into an IGU cavity defined by a spacer, such as the spacer 105A, into which the spacer key 150D may be inserted and ends of which the spacer key 150D may separate to electrically insulate portions of such a spacer.

The spacer key 150D may include a lip 44 and a cavity 47A on one end. As shown, the spacer key 150D may have a solid core such that the lip 44 of the spacer receptacle 45A may rest on a step formed in the spacer key 150D that may provide a stop to locate the spacer receptacle 45A in the spacer key 150D such that the lip 44 of the spacer receptacle 45A is flush with an outer surface of the spacer key 150D. As further shown, a spacer receptacle seal 38A may surround and may abut the lip 44 of the spacer receptacle 45A. In this manner, the spacer receptacle seal 38A may prevent leakage of gases that may be within an IGU cavity or may prevent intrusion of moisture into the IGU cavity. A narrow portion 36A of the pin 72A may be received within the cavity 47A of the receptacle 45A.

Inner riser seals 73A may be received in opposing grooves along a length of the riser 71A. Although not shown, the riser seals 73A may surround, but as shown may not contact, the pin 72A. The inner riser seals 73A may seal against the outer surface of the spacer key 150D. Such seals 73A may prevent leakage of gases that may be within the IGU cavity or may prevent intrusion of moisture into the IGU cavity. In some alternative arrangements, the riser seals 73A may have a thickness such that the riser seals 73A contact the pin 72A, such as is shown with respect to a pin 72B in FIG. 2I, as discussed further herein.

As further illustrated in FIG. 2H, outer riser seals 89 may surround and may seal against the pins 72A extending through the riser. In some arrangements, as shown, the pin 72A may include a portion that may have a relatively wider perimeter or diameter than another portion of the pin 72A and that may extend through the riser 71A against which the outer riser 89 may be seated and may seal. As further shown, the pin 72A may be received through a hole extending from an inner surface of redistribution connector 75A until a pin flange 37A extending radially from the pin 72A is seated against a housing base 76A of the redistribution connector 75A. As shown, the flange 37A of the pin 72A may be seated within a cavity and may have a shape that conforms to the cavity within the housing base 76A of the redistribution connector 75A.

As shown, the pins 72A may extend through corresponding holes (not shown) of an electrical wiring system 89 such as a printed circuit board assembly received within the housing base 76A of the redistribution connector 75A. Such holes may be defined by conductive contacts of the printed circuit board assembly 89. The redistribution connector 75A may include an encapsulation that may cover and that may insulate the electrical wiring system 89. In this manner, the receptacle 45A may be electrically interconnected with the redistribution connector 75A through the pin 72A. The receptacle 45A may be electrically interconnected with busbars within an IGU cavity such that the busbars may be electrically interconnected with the redistribution connector 75A.

Figure 2I:
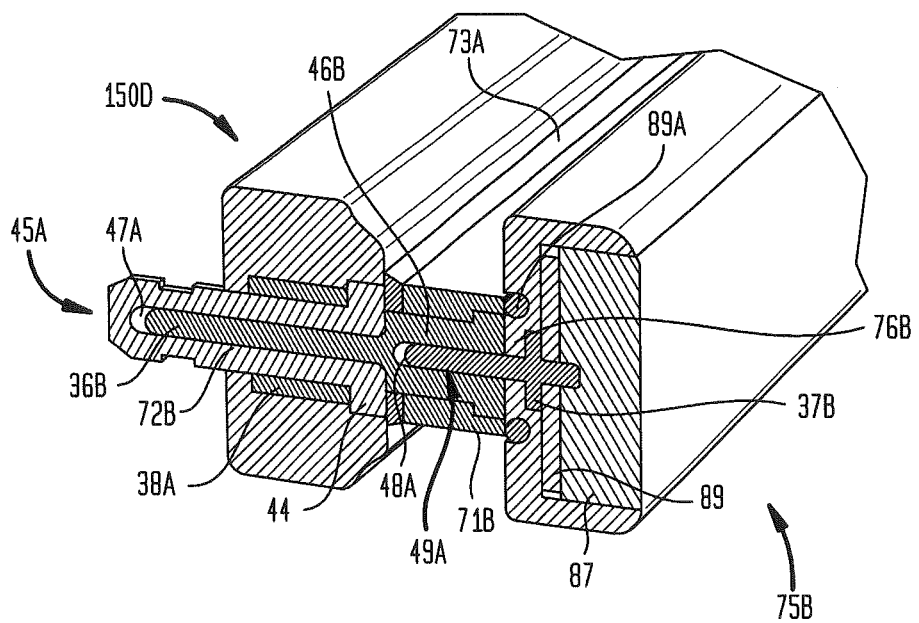

As illustrated in FIG. 2I, in an alternative arrangement to the one shown in FIG. 2H, a first pin 72B, or a plurality of first pins 72B, having a narrow inner portion 36B and a wider outer portion 46B may be received within the cavity 47A of the receptacle 45A. As shown, when the first pin 72B is received in the receptacle 45A, the wider outer portion 46B may abut the lip 44 of the receptacle 45A to provide a stop as to the depth of insertion of the pin 72B within the receptacle 45A.

As further shown in FIG. 2I, the wider outer portion 46B of the first pin 72B may have a length such that the wider outer portion 46B extends between the lip 44 of the receptacle 45A and a housing base 76B of a redistribution connector 75B. In such arrangements, a riser 71B may extend in a direction parallel to lengths of the spacer key 150D and the redistribution connector 75B. The riser 71B may surround the plurality of the wider outer portions 46B. In some arrangements, the seal 73A may be seated between the riser 71B and the spacer key 150D such that the riser does not contact the lip 44 of the receptacle 45, in contrast to the riser 71A described previously herein. The riser 71B may seal against a seal having a perimeter or a pair of spaced apart seals, such as but not limited to rubber and other elastomeric seals that may be pressed into a groove along the length on opposite sides of the housing base 76B of the redistribution connector 75B.

The wider outer portion 46B of the pin 72B may include a cavity 48A in which a shaft of a second pin 49A may be received. The pin 49A may have a pin flange 37B and may extend into the redistribution connector 75B in the same manner as the pin 72A may extend into the redistribution connector 75A. Each of the receptacle 45A, the first pin 72B, and the second pin 49A may be made of conductive materials such as but not limited to copper and other conductive materials described previously described herein. In this manner, the first pin 72B and the second pin 49A may be electrically interconnected to each other. Further, the receptacle 45A may be electrically interconnected with the redistribution connector 75B through the first and second pins 72B and 49A. Accordingly, the receptacle 45A may be electrically interconnected with busbars within an IGU cavity such that the busbars may be electrically interconnected with the redistribution connector 75B, in particular the electrical wiring system 89 disposed within the redistribution connector 75B.

Referring now to FIG. 2J, in another alternative arrangement to that shown in FIG. 2G, a riser 170 may include extensions 173 that may be inserted into the respective holes 121 of the spacer key 150C. A redistribution connector 175 may include pins 172 extending from a body 176, in which the pins 172 may have a length such that the pins 172 may be inserted through holes passing through a width of the riser 170. In the example shown, the riser 170 may have a width such the holes passing through the width are exposed or at least easily accessible upon removal of the thin layer of the secondary seal after the deposition of the secondary seal as described further herein. In this manner, the pins 172 may be physically interconnected with the pins 39B of the spacer key 150C, even after the deposition of the secondary seal. As further shown, a plug 177 may be attached to the body 176 of the riser 170 by a cable 178 extending between the body 176 and the plug 177 of the redistribution connector 175.

In another arrangement shown in FIG. 2K, an IGU 11D may include a spacer key 250 inserted within the spacer 105A. In this example, the spacer key 250 may include a recess 221 such that pins 139 may extend from an IGU cavity defined by the inner surface of the spacer 105A, through the width of the spacer key 250, and into the recess 221 extending from the exterior surface of the spacer key 250. The recess 221 may be dimensioned to receive but is not limited to receiving a gasket 273, in some arrangements as shown, or a series of individual gaskets in some other arrangements. The gasket 273 may have separated holes, as further shown, or individual gaskets in some arrangements may have holes for receiving and surrounding the pins 139.

As shown, the pins 139 may have a female configuration into which male-configured pins 272 extending from a body 276 of a redistribution connector 275 may be received. In such an arrangement, the pins 272 also may be inserted through the holes of the gasket 273, respectively, such that the body 276 of the redistribution connector 275 may be placed flush against the gasket 273. In this manner, the gasket 273 or gaskets may provide a seal against moisture entering or gases escaping from the IGU cavity along an interface between the pins 139 and the spacer key 250 through which the pins 139 are inserted. As further shown in FIG. 2K, in some arrangements, the redistribution connector may have a pigtail configuration such that a plug 277 may extend from a cable 278 for interconnection with other electrical sources.

As illustrated in FIG. 3A, an IGU 111 may include a spacer 205 having an inner surface 207 in which a portion of the inner surface 207 defines an inner front hole 31 and may include an outer surface 208 in which a portion of the outer surface 208 defines an outer hole 32. In some arrangements, as shown, the outer hole 32 may have a larger diameter than the diameter of the inner front hole 31, whereas in other arrangements, the inner front hole 31 may have a larger diameter than the diameter of the outer hole 32 for receiving a comparably sized portion of an insulative tube 40.

As shown, the insulative tube 40 may be a molded structure which may be formed by any number of processes known to those of ordinary skill in the art, such as by injection molding. The insulative tube 40 may be a monolithic structure and may be formed of materials such as but not limited to any of PVDC, PVC, and other insulative or non-conductive materials previously described herein. The insulative tube 40 may include a front plate 41 for abutment with the inner surface 207 around the inner front hole 31. The front plate 41 may cover the inner front hole 31 and a sealant may be applied but is not limited to being applied around a perimeter of the front plate 41 or the diameter of the inner front hole 31 to prevent leakage of gases that may be within the IGU cavity or to prevent intrusion of moisture into the IGU cavity. The insulative tube 40 may include a tube connector 42 that may extend from the front plate 41. As shown, in some arrangements, the tube connector 42 may be cylindrical or substantially cylindrical. In some such arrangements, the tube connector 42 may have a diameter that fits within the inner front hole 31 and that, in some arrangements, may also fit through the outer hole 32 of the spacer 205.

The tube connector 42 of the insulative tube 40 may form a male-female connection with one or both of a coupling 50 and a coupling seal 69. As further shown in FIG. 3A, in some arrangements, the coupling 50 may be a cylindrical tube having an inner perimeter 51 approximately the same as an outer diameter of the tube connector 42 of the insulative tube 40. In some arrangements, the coupling seal 69 may be in the shape of a cylindrical disk having an inner perimeter approximately the same as the outer diameter of the tube connector 42. As shown in FIG. 3A, in such configurations, the coupling seal 69 may be placed around the tube connector 42 and be seated against an interior surface of the spacer 205 around the inner front hole 31 such that the coupling seal 69 may serve to prevent gases, including inert gases such as argon commonly used in electrochromic IGUs, from escaping the IGU cavity as well as to prevent moisture from entering the IGU cavity. In some arrangements, a second coupling seal (not shown) may be placed, in addition to or in place of the coupling seal 69, around the inner front hole 31 of the spacer 205 between the inner surface 207 of the spacer 205 and the front plate 41 of the insulative tube 40. Such a second coupling seal may be the same as or substantially similar to the coupling seal 69.

The tube connector 42 of the insulative tube 40 and the inner perimeter 51 of the coupling 50 may each be threaded such that the tube 40 and the coupling 50 may be threadedly engaged. In alternative arrangements, the tube 40 and the coupling 50 may be engaged through a compression fit, i.e., an interference fit.

The IGU 111 may include a rear tube 370 that may include a rear plate 371 for abutment with the outer surface 208 of the spacer 205. The rear tube 370 may include a rear flange 72 that may extend from the rear plate 371. The rear flange 372 may be cylindrical or substantially cylindrical such that the rear flange 372 fits within the outer hole 32. In some arrangements, a seal (not shown), which may be the same or substantially similar to the coupling seal 69, or a sealant, may be used in conjunction with the rear tube 370 in a manner similar to the use of a seal or sealant with the insulative tube 40.

As further shown in FIG. 3A, an outer end of the coupling 50 may have an outer perimeter such that the coupling 50 may be inserted within a corresponding inner perimeter of the rear tube 370. As shown, in some arrangements, the inner perimeter may extend through each of the rear plate 371 and the rear flange 372 of the rear tube 370. In some arrangements, the inner perimeter of the rear tube 370 may include a step (not shown) against which a rear face of the coupling 50 may be seated. In alternative arrangements, the rear flange of the rear tube may be dimensioned for insertion into a rear portion of the inner perimeter of the coupling 50.

A conductive element 239, such as a rigid metallic pin, may be inserted into an inner perimeter (not shown) of the tube connector 42. In the arrangement shown in FIG. 3A, the larger outer hole 32 may facilitate accessibility within the spacer 205 to aid in the insertion and attachment of the rear tube 370 and the coupling 50 as well as other sealing elements such as gaskets and sealants that may be used to seal the outer hole 32. Such an arrangement may be preferable when the inner surface of the spacer 205 includes venting perforations (not shown). In some arrangements, the larger outer hole 32 may permit a flexible connection to the conductive element 239, such as by a wire that may begin to veer from a longitudinal axis of the conductive element 239 prior to exiting the interior of the spacer 205 through the outer hole 32 of the spacer 205. In some alternative arrangements, the conductive element 239 may be in the form of a plate-like tab or a female receptacle extending through the spacer, or a flat pad that may run parallel to the inner surface of the spacer. As shown in FIG. 3A, an inner end of the conductive element 239 may include a forked section 43 having two prongs.

As further shown, a conductive coil 25 may be physically connected to the conductive element 239. The conductive coil 25 may have a flat portion 26 on one end for insertion into the forked section 43 of the insulative tube 40 and tab 28 on an opposite end that may be attached to a connecting section 17 of the busbar 13 that may extend in a perpendicular direction. In this manner, the insulative tube 40 may be electrically connected to the busbar 13 through the conductive coil 25. In some arrangements, the conductive coil 25 may have a winding section 26 that may coil in either or both of clockwise and counterclockwise directions. In some arrangements, as shown, the tab 28 may be formed on an end of a flat portion of the conductive coil 25. In some arrangements, the tab 28 may be but is not limited to being soldered (not shown) to a busbar.

FIG. 3A illustrates the tube connector 42 of the insulative tube 40 as a male connection for engaging a female connection of the coupling 50. In some alternative arrangements, the tube connector may form the female connection and the coupling 50 may form the male connection. In some other alternative arrangements, the insulative tube 40 may extend through the width of the spacer 205 into the rear flange 372 when an outer diameter of the tube connector fits within the inner diameter of the rear flange and around the rear flange when an inner diameter of the tube connector is larger than the outer diameter of the rear flange of the rear tube. In still other alternative arrangements, the rear tube and the coupling may form a monolithic structure, i.e., a unitary or one-piece body, which may be similar to the rear tubes 470 illustrated in FIG. 3B and described further herein.

Still referring to FIG. 3A, the IGU 111 may include a cover 80 that may cover the insulative tube 40 and the conductive coil 25. The cover 80 may be but is not limited to being in the shape of a rectangular prism or other aesthetically desirable shapes. In this manner, the insulative tube 40 and the conductive coil 25 may be desirably blocked from viewing in the viewable area of the frame.

In conjunction with or as an alternative to the coupling seal 69, a sealant (not shown), such as but not limited to PIB, butyl, ethylene vinyl alcohol (EVOH), epoxides polyvinyl alcohol (PVOH), silicone and blends thereof, polysulfide or polysulphide, thermoplastic polyurethane (TPU), thermoplastic polyurethane elastomer (TPUE), polysulfone (PSU) and blends thereof, polyphenylsulfone (PPSU) and blends thereof, polyethersulfone (PESU) and blends thereof, SAN (styrene acrylonitrile), ASA (acrylonitrile styrene acrylate), may be applied around the front hole 31 to seal the IGU cavity to prevent the gases from escaping the IGU cavity and to prevent moisture from entering the IGU cavity. The sealant, may also be applied around the insulative tube 40 at the interface of the tube 40 with the front hole 31 defined by the spacer 205.

Referring now to FIG. 3B, an IGU 211 may be substantially the same as the IGU 111 with the exception that the IGU 211 may provide for multiple interconnections through a spacer 305 to multiple busbars within the IGU cavity. In the example shown, three separate interconnections through the spacer 305 may be made through an insulative tube set 140. The insulative tube set 141 may include a single front plate 141 from which three separate tube connectors 142 may extend through three corresponding front holes 31 through an inner surface 307 of the spacer 305. As further shown in FIG. 3B, in some arrangements, rear tubes 470 and corresponding coupling seals 169 may be inserted through respective outer holes 32. In this manner, the rear tubes 470 and the coupling seals 169 may be coupled to the respective tube connectors 142 of the insulative tube set 140. In the example shown, the coupling seals 169 may be placed around the tube connectors 142 such that the seals 169 provide sealing around the respective inner front holes 31. As further shown in this example, the tube connectors 142 may be threaded into the integrated rear tubes 470.

In some alternative arrangements, each of the tube connectors 142 may be inserted within respective combinations of rear tubes 70, couplings 50, and coupling seals 69, or variations thereof, as previously described herein with respect to FIG. 3A and alternative arrangements thereof, which may be inserted within larger rear holes that are the same or similar to the rear hole 32 shown in FIG. 3A. Such respective rear tubes 70, couplings 50, and coupling seals 69 may be inserted through rear holes (not shown) of the spacer 305 that may be the same or substantially similar to the rear hole 32 shown and described with respect to FIG. 3A.

In some alternative arrangements, the rear tube may include an integrated or monolithic flat rear plate (not shown) from which three separate rear flanges may extend. In such arrangements, the rear flanges may interface with respective couplings which may be the same or substantially similar to the couplings 50 shown and described with respect to FIG. 3A. In this manner, in such alternative arrangements, the separate front holes 31 as shown and described with respect to FIG. 3B may be replaced by a single slot into which an insulative tube, such as the insulative tube 140, may be inserted.

Three pins 139 may pass through each of the tube connectors 142, respectively, of the insulative tube set 141. Each of the pins may be electrically conductive. The pins may be made of materials such as but not limited to any of copper and other electrically conductive plated metals. In some arrangements, outer ends of the pins 139 may pass through the spacer 305 and beyond the rear tube 470 such that the outer ends may be connected to corresponding conductive components on the exterior of the IGU cavity. Such conductive components may be, for example, a pigtail wire harness or a connector type head having conductive features for engagement with the pins 139 as known by those of ordinary skill in the art. In some arrangements, an inner end of the pins 139 may be attached to corresponding conductive coils 125, respectively. In some such arrangements, the conductive coils 125 may include connecting portions 126 that may wrap in a circular pattern around the respective inner portions of the pins 139 (as further shown in and described with respect to the alternative arrangement shown in FIG. 3C). In such configurations, the connecting portions 126 may be tightly wrapped around the respective inner ends of the pins 139 such that the respective conductive coils 125 do not become dislodged during either of transport and installation of the IGU 211 into an architectural frame. In some arrangements, a set of three spaced apart busbars 113 having corresponding main sections 116 and connecting sections 117 may be applied along the glass panel 2. As shown, the connecting sections 117 of two of the busbars 113 may extend from the corresponding main sections 116 in the same direction while one of the set of busbars 113 may extend in the opposite direction from the corresponding main section 116. In such configurations, the conductive coils 125 may be turned such that ends of the coils 125 opposite the connecting portions 126 may be aligned with a longitudinal axis along and attached to the connecting sections 117 of the busbars 113. In some such arrangements, the connecting portions 126 may be aligned with and attached to ends of the connecting sections 117 of busbars 113, which may be tabs, such as the tabs 128 described with respect to FIG. 3A.

In some arrangements, the conductive coils may have either of varying widths and thicknesses (not shown) to allow for either or both of maximum low stress deflection and flexibility in directions where such deflections and flexibility are needed as well as maximum stiffness as needed. Although also not shown, a decorative cover may be placed over the insulative tube set 140 and the conductive coils 125 to provide for a more aesthetically pleasing view within the viewing area of the IGU when placed into a architectural framing system.

Figure 3C:
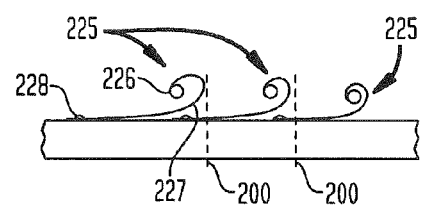
FIG. 3C is a side cross-sectional view of a schematic of three conductive coils for use in electrical feed-through interconnection, in which each of the coils are attached to a busbar and spaced a predetermined distance from the other of the coils in accordance with an embodiment.

As illustrated in FIG. 3C, in some alternative configurations of IGUs allowing for multiple interconnections from within the IGU cavity and through a spacer, a set of conductive coils 225 may have respective connecting portions 226 for coiling about a conductive pin, such as the pins 139, and winding sections 227 between the respective connecting portions 226 and corresponding ends for attachment to ends of busbars. As shown, in such configurations, the winding section 227 of one coil of the set of conductive coils 225 preferably does not overlap a plane through a cross-section of the adjacent coil that is perpendicular to a length of the coil at a predetermined location of the adjacent coil such that the winding sections 227 of the adjacent coils 225 do not contact each other. In this manner, adjacent conductive coils 225 may be placed in close proximity and may have the same orientation within an IGU cavity without contacting each other and causing an electrical shorting of the coils 225.

Figure 4A:
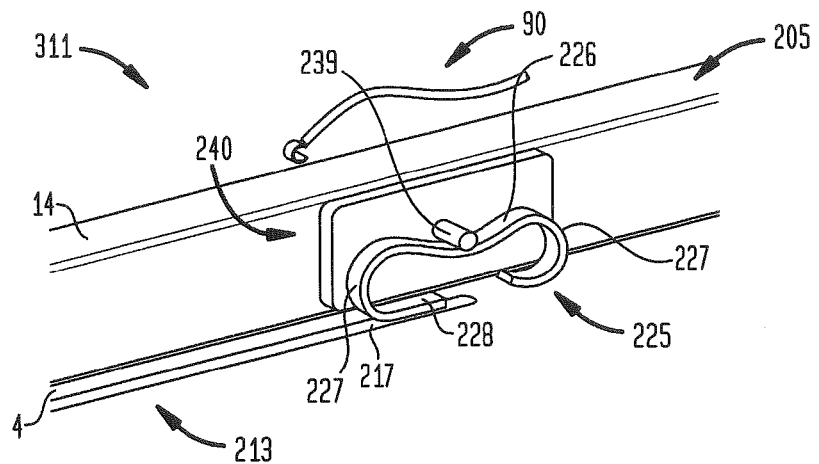
FIGS. 4A and 4B are perspective views of portions of IGUs having electrical feed-through interconnections through respective spacers of the IGUs in accordance with some embodiments.

FIG. 4A illustrates another alternative arrangement of an embodiment in which an insulative tube or sets of insulative tubes may hold and may align a pin that may be used for electrical interconnection between busbars within an IGU cavity and conductive components outside of the IGU cavity. As in this example, the pin 139 may pass through an insulative element 240, which, in some arrangements, may be the same or substantially the same as the insulative tube 140. As shown, a conductive coil 225 may be placed below an inner end of the pin 139 extending within an IGU cavity defined by the spacer 205. The conductive coil may have opposing winding sections 227 that coil in opposite directions, i.e., clockwise and counterclockwise directions. A connecting section 226 between the opposing winding sections 227 may be compressed against the inner end of the pin 139. In this manner, the connecting portion 226 may maintain contact with the pin 139.

As further shown, the conductive coil 225 may be attached at a tab 228 of the conductive coil to a connecting portion 217 of a busbar 213 extending in a direction parallel to a length of the spacer 205. An outer end of the pin may be connected to a wire connector 90. In this manner, the busbar 213 may be electrically interconnected with the wire connector 90. Although not shown, as in arrangements described previously herein, a cover, such as the cover 80 shown in FIG. 3A may be secured in place over the insulative element 240 and the conductive coil 225 of the IGU 311.

Figure 4B:
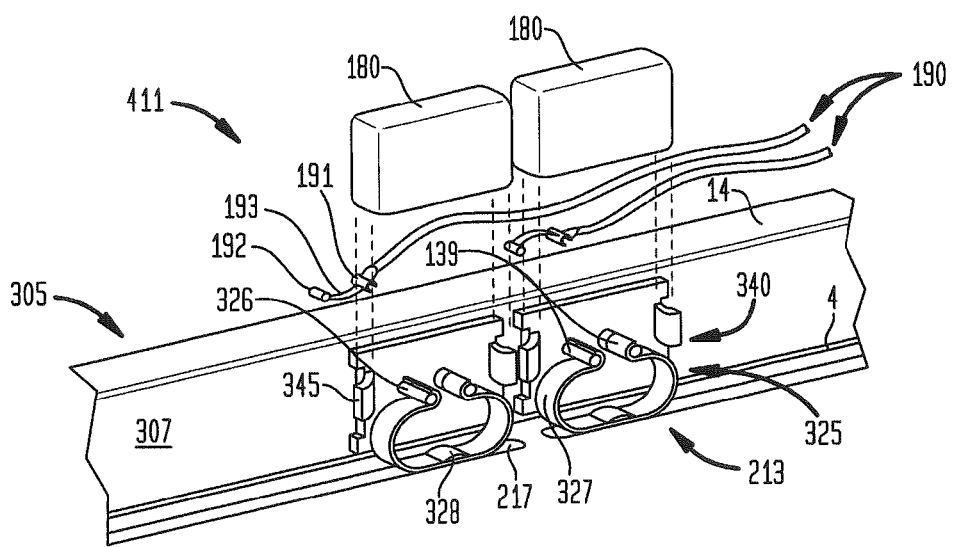

As shown in FIG. 4B, in a variation of the arrangement of FIG. 4A, a plurality of insulative elements 340 may be inserted into a spacer 305 of an IGU 411. The insulative element 340, in some arrangements, may be the same or substantially similar to the insulative element 240 or the insulative tube 40, with the exception that the insulative element 340 may have opposing pressing tabs 345 that may extend inwardly toward the IGU cavity when the insulative element 340 is inserted into the spacer 305. Such pressing tabs 345 may allow sides of the insulative element 340 to be more easily gripped for pressing the insulative element 340 into the spacer 305 or for removing the insulative element 340 from the spacer 305.

As further shown, in some such arrangements, a set of conductive coils 325 may each have tabs 328 that may be attached to respective connecting portions 217 of busbars 213. The respective tabs 328 may be positioned between two opposing winding sections 327 that may curl from the tabs 328 to separated connecting sections 326 of the conductive coils 325. As shown in FIG. 4B, the connecting sections 326 may be coiled around the inner ends of the respective pins 139 in the same manner as the connecting sections 126 may be wrapped around the pins 139 as shown in FIG. 3B and the connecting sections 226 shown in FIG. 3C may be wrapped around respective pins. In this manner, a plurality of electrical interconnections may be established through the insulative element 340. As further shown in FIG. 4B, each of a set of wire connectors 190 may be connected to an outer end opposite the respective inner end of the pins 139 passing through the insulative element 340. Each wire connector 190 may have coiled ends 191, 192 that may be spaced apart and held together by a bridge 193. Each of the coiled ends 191, 192 of the wire connector 190 may be attached to the respective pins 139 passing through a corresponding insulative element 340. In this manner, a parallel circuit may be formed between the busbar 213 and the corresponding wire connector 190.

As in arrangements discussed previously herein, a cover may be secured in place over each of the insulative element 340 and the corresponding conductive coil 325 of the IGU 411. In a variation of such covers, a cover 180, as shown in FIG. 4B may have one or more tabs (not shown) within a cavity of the cover 180 that may be slid between the spacer 305 and the pressing tabs 345. In this manner, the cover 180 may be held against an inner surface 307 of the spacer 305 facing inwardly toward the IGU cavity.

Figure 5A:
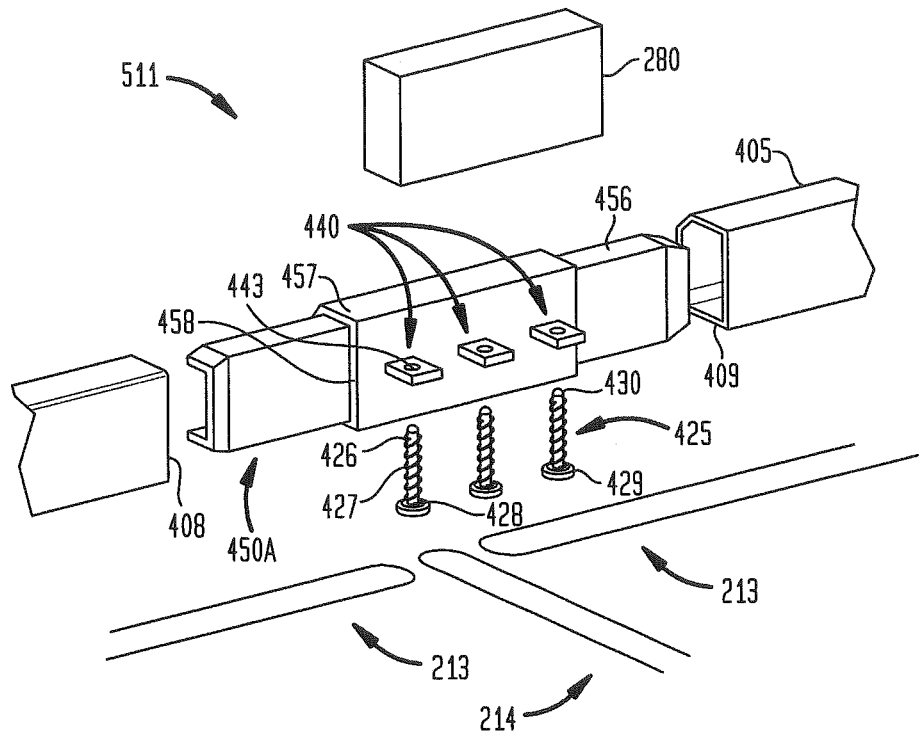
FIGS. 5A-5D are exploded views of portions of IGUs having electrical feed-through interconnections through respective spacer keys of the IGUs in accordance with some embodiments.

Referring now to FIG. 5A, an IGU 511 may include a spacer key 450 that may include opposing key ends 456 for insertion into openings within separated spacer ends 408, 409, respectively, of a spacer 405. As shown, the spacer key 450A may include a shoulder section 457 such that each of the key ends 456 may be inserted into the respective openings of the spacer ends 408, 409 to a point at which the opposing edges of the shoulder section 457 may abut the respective spacer ends 408, 409. In some arrangements, the spacer key may be a shoulder spacer key such as those described in U.S. Provisional Application No. 61/664,992, the entire disclosure of which is hereby incorporated herein by reference in its entirety. The spacer key 450A may be made of insulative materials to prevent electrical shorting caused by contact with the spacer 405.

As shown in this example, a plurality electrical contact pads 440 may extend inwardly from the spacer key 450 toward the IGU cavity. In some arrangements, the contact pads 440 may have the same dimensions or a similar shape to prongs on standard 120V outlet plugs. Each of the contact pads 440 may include guide holes 443 through which one of the ends of respective connection pins 430 may extend. The respective connection pins 430 may have pin pads 429 on their respective opposite ends for contacting outer busbars 213 and an inner busbar 214 in order to establish an electrical interconnection between the busbars 213 and the conductive pads 440.

In some arrangements, the pin pads 429 may be movable in the direction of and in the direction away from the respective busbars 213, 214. As shown, wire coils 425 may wrap around the respective connection pins 430. In the example shown, the wire coils 425 may be coiled springs having a central portion 427 between opposing ends 426, 428. In such arrangements, the wire coils 425 may be maintained in a compressive state between the respective electrical contact pads 440 and pin pads 429. In this manner, the wire coils 425 may apply a force against the connection pins 430 which may be used to maintain the connection pins 430 against the busbars 213, 214 even when external forces, such as wind or other environmental conditions, are applied to the IGU 511. In alternative arrangements, the wire coils 425 may exhibit flexibility such that they do not maintain their shape without external support. In some alternative arrangements, at least some of the pin pads 429 may be soldered to the respective busbars 213, 214. In some arrangements, especially where the pin pads 429 may be soldered to the busbars 213, 214, the connection pins 430 may be flexible to reduce stresses that may otherwise be caused by bending forces applied to the connection pins 430. In some such arrangements, the guide holes 443 may be dimensioned to permit movement of at least portions of the connection pins 430 in a direction perpendicular to a longitudinal axis of the connection pins 430.

Figure 5B:
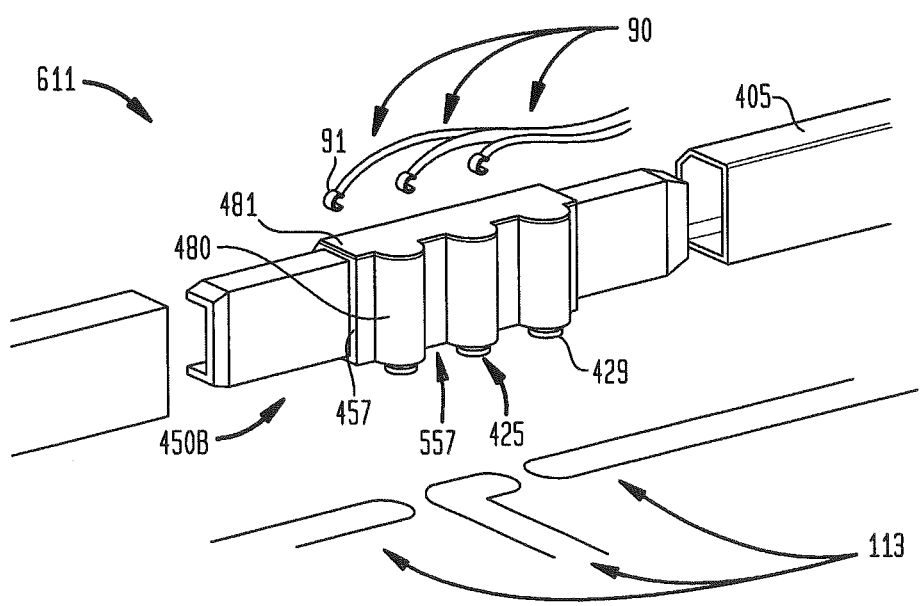

As further shown in FIG. 5A, in some arrangements, the ends 428 of the wire coils 425 may be attached, such as by but not limited to being by soldering, to the respective pin pads 429, and the ends 426 of the wire coils 425 may be attached, such as by but not limited to being by soldering, to the respective contact pads 440. In this manner, the wire coil 425 may establish an electrical interconnection between the busbars 213, 214 and the respective contact pads 440. Although not shown in FIG. 5A, each of the contact pads 440 may extend through a width of the spacer key 450A such that the contact pads 440 may be electrically connected, such as by way of a wire connector 90 as shown in FIG. 5B discussed further herein, to conductive components external to the IGU cavity, as previously described herein.

As further illustrated in FIG. 5A, a cover 280 may be placed over the plurality of connection pins 430 and the corresponding plurality of contact pads 440 to achieve an aesthetically desirable appearance as discussed with respect to other such arrangements of covers as discussed previously herein. Referring now to FIG. 5B, in a variation of the IGU 511, an IGU 611 may include a spacer key 450B that may be the same or substantially the same as the spacer key 450A with the exception that a housing 557 may be placed around the shoulder section 457 of the spacer key 450B in lieu of the cover 280. The housing 557 may include an inner panel 480 facing inwardly toward the IGU cavity having tubular sections for receiving the contact pads 440, the connection pins 430, and the wire coils 425 when wrapped around the connection pins 430. The housing 557 may further include body 481 that may wrap around the other sides of the shoulder section 457 of the spacer key 450B. In some such arrangements, the contact pads 440 may extend through the width of the spacer key 450B such that the contact pads 440 may be attached to wire connectors 90 to enable electrical interconnection between the busbars 113 and the corresponding wire connectors 90. In an alternative arrangement of the IGU 611, the housing and the shoulder section may form a monolithic structure (not shown) with each other.

Figure 5C:
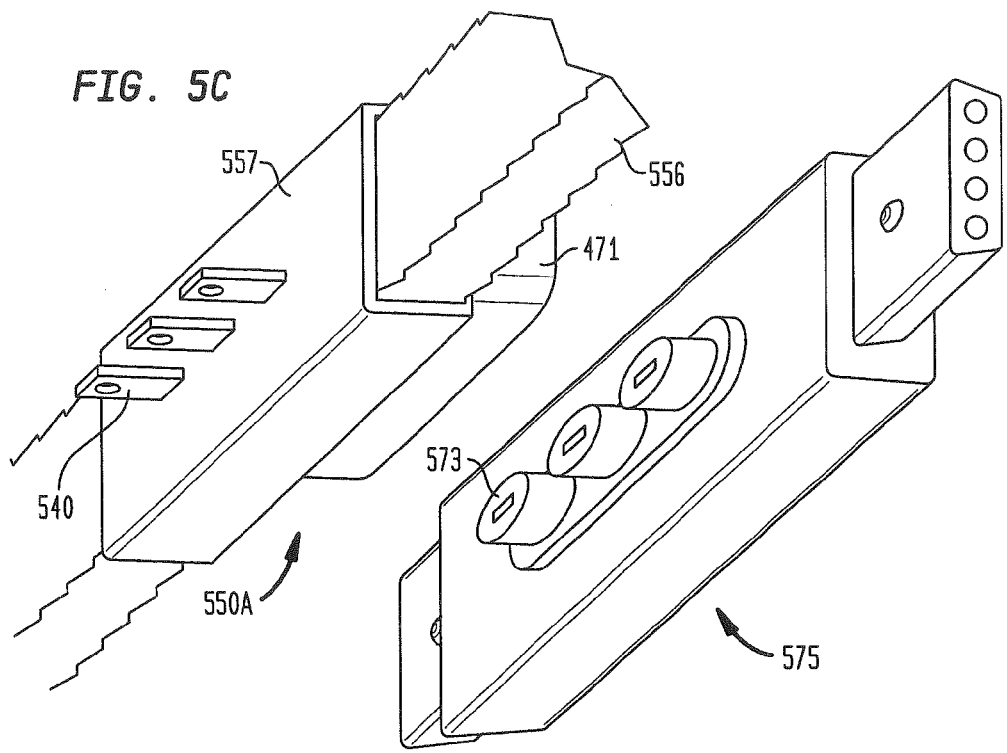
Figure 5D:
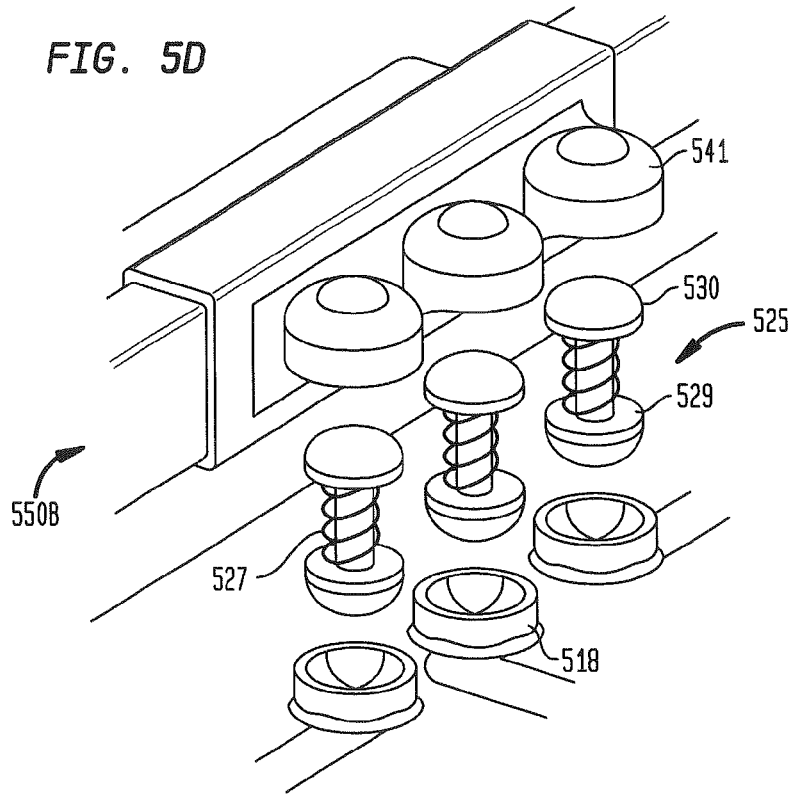

In an alternative arrangement to that shown in FIG. 5A, FIG. 5C illustrates a spacer key 550A that may be used in conjunction with the spacer 405 in place of the spacer key 450A. In such an arrangement, the spacer key 550A may include a shoulder section 557 and opposing key ends 556 for insertion into the separated spacer ends 408, 409, respectively, of a spacer 405. As shown, the opposing key ends 556 may have fins at the edges along the lengths of the key ends 556. In some arrangements, the spacer key 550A may include a riser 471 which may form a monolithic structure, i.e., a one-piece or integrated body, with the shoulder section 557, as shown, or which may be separate integrated structures, or even a separate structure or separate structures that may be at least partially inserted into the shoulder section 557. In some arrangements, the spacer key 550A may include prongs 540 that may have substantially the same shape as the prongs 440 described with respect to FIG. 5A. In some arrangements, the prongs 540 may have a length that may extend through widths of both the riser 471 and the shoulder section 557 and into an IGU cavity defined by the IGU spacer 405 (not shown in FIG. 5C).

As further shown in FIG. 5C, a redistribution connector 575 may include features substantially similar to the redistribution connector 75 but which may include extensions 573 that may be dimensioned for insertion into the riser 471. In some such arrangements, as further shown, the extensions 573 may define slits or elongated holes located centrally in the extensions 573 that may be dimensioned to receive the contact pads 540 of the spacer key 550A. In this manner, busbars deposited within an IGU cavity may be electrically interconnected to electrical components external to the IGU, as described previously herein.

In an alternative arrangement to those shown in FIGS. 5A and 5C, upper connectivity heads 541, that may be dome-shaped as shown, may extend within an IGU cavity in place of contact pads such as the contact pads 440 and 540. As shown, lower connectivity heads 518, that may be dome-shaped, may be attached such as by but not limited to being by soldering to busbars within the IGU cavity. In some such arrangements, wired pins 525 may include an upper dome 530 that may be dimensioned to be inserted within the respective upper connectivity heads 541 and may include a lower dome 529 that may be dimensioned to be inserted within the respective lower connectivity heads 518. As further shown, a spring 527 may wrap around a central shaft connecting the lower and upper domes 529, 530 of the wired pins 525. In some arrangements, the central shaft may be telescoping. In this manner, the wired pins 525 may be maintained in compression between the lower and upper connectivity heads 518, 541 while allowing for relative movement between the lower and upper connectivity heads 518, 541 caused by external forces, such as environmental stresses placed on the IGU. In some arrangements, at least a concave underside of the lower and upper connectivity heads 518, 541 may be electrically conductive to allow for electrical interconnection between electrical components external to the IGU cavity and the busbars to which the respective lower connectivity heads 518 may be attached, as described with respect to other electrical connectivity arrangements described previously herein.

Figure 6A:
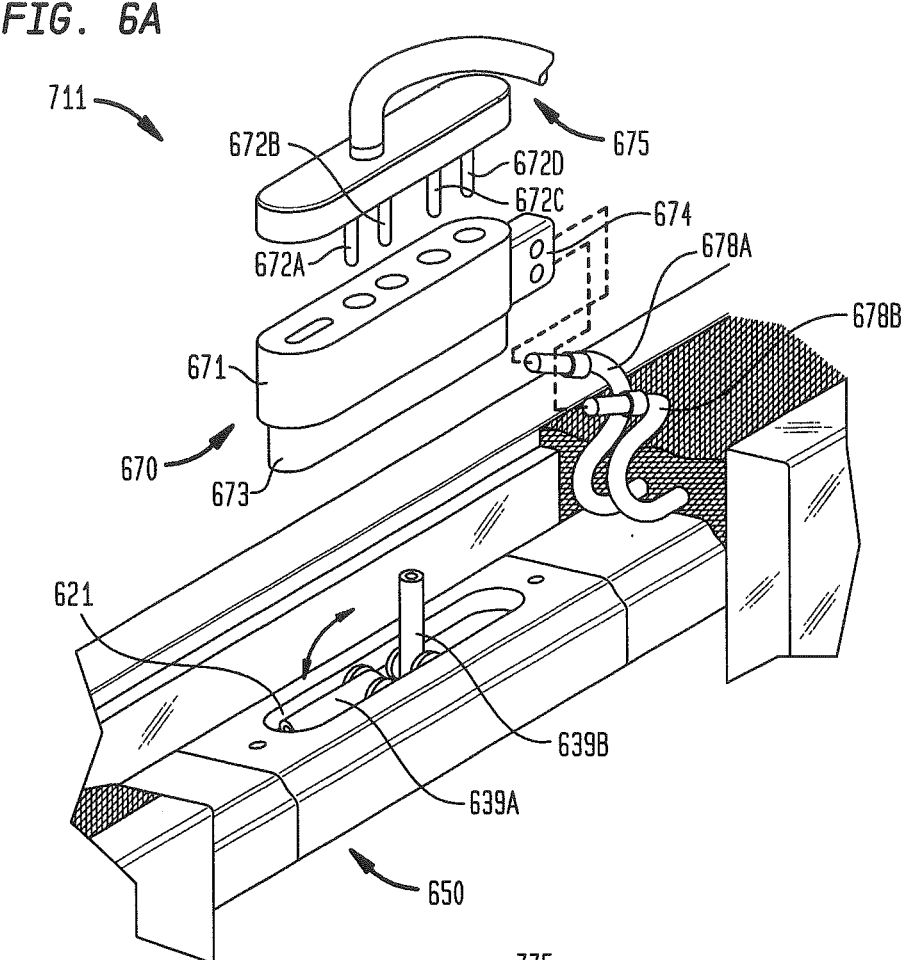
FIGS. 6A and 6B are exploded views of portions of IGUs having electrical feed-through interconnections through respective spacer keys of the IGUs in accordance with some embodiments.

Referring now to FIG. 6A, an IGU 711 may include a spacer key 650 that may include a recess 621 that may extend inwardly from an outer surface of the spacer key 650. In some arrangements, a plurality of articulating contacts 639A, 639B, may be attached to the recess 221. As shown, the articulating contacts 639A, 639B may be attached, such as by but not limited to being by pins or fasteners, to sidewalls of the recess 221 such that the contacts 639A, 639B may each be separately rotated from a fully closed position in which the articulating contacts 639A, 639B lie entirely within the recess 221 to a fully open position in which the articulating contacts 639A, 639B extend outwardly away from the spacer key 650. In this manner, the articulating contacts 639A, 639B may be placed in the closed position during portions of the assembly process, typically during automated such portions of the assembly process of the IGU 711. Then, during other, typically later, assembly processes, the articulating contacts 639A, 639B may be placed in the open position such that a riser 670 may be placed over the articulating contacts 639A, 639B such that respective holes defined by and extending through the riser 670 surround the extended contacts 639A, 639B. The contacts 639A, 639B may be connected to pins (not shown) extending through a portion of the spacer key 750 and into an IGU cavity such as those described previously herein to provide an electrical interconnection between the contacts 639A, 639B and busbars applied to a glass lite panel within the IGU cavity, such as those described previously herein.

In some such arrangements, the riser 670 may include a body 671, an extension 673, and a transverse connector 674 extending in a direction perpendicular to longitudinal axes of the holes extending through the riser 670, as further shown in FIG. 6A. A plurality of cables 678A, 678B may be inserted into and thus electrically interconnected to the transverse connector 674 and may provide electrical interconnections between the riser 670 and either or both of other busbars or spacer keys or to other electrical components.

Following placement of the riser 670 over the articulating contacts 639A, 639B of the spacer key 650, a redistribution connector 675 may be physically connected to the articulating contacts 639A, 639B such that pins 672A, 672B may be inserted within the articulating contacts 639A, 639B through the holes defined by the riser 670. In some arrangements, such as in the example shown, pins 672C, 672D of the redistribution connector 675 may be electrically connected through the riser 670 to the cables 678A, 678B, respectively. The redistribution connector 675 may have a pigtail configuration, similar to the configuration described with respect to FIG. 2K, such that any of the spacer key 650 and the cables 678A, 678B may communicate with peripheral electrical components (not shown), as described previously herein.

Figure 6B:
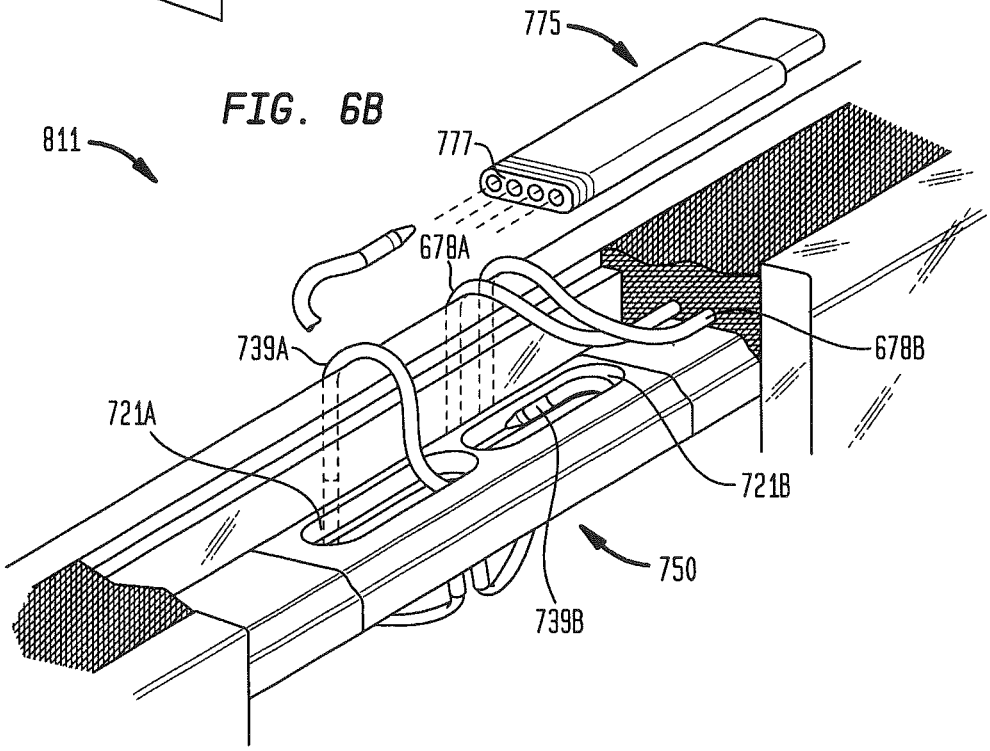

In another arrangement shown in FIG. 6B, an IGU 811 may include a spacer key 750 that may include a plurality of recesses 721A, 721B extending inwardly from an outer surface of the spacer key 750 in which respective cables 739A, 739B may be placed. In this manner, during portions of the process of assembling the IGU 811, the cables 739A, 739B may be inserted within the respective recesses 721A, 721B such that the cables 739A, 739B do not protrude above the outer surface of the spacer key 750. The cables 739A, 739B may be connected to pins extending through a portion of the spacer key 750 and into an IGU cavity, such as those described previously herein, to provide an electrical interconnection between the cables 639A, 639B and busbars applied to a glass lite panel within an IGU cavity of the IGU 811.

A redistribution connector 775 adjacent to the spacer key 750 may include a conduit 777. During certain assembly processes, the cables 739A, 739B may be removed from the respective recesses 721A, 721B and any of the cables 739A, 739B, 678A, and 678B may be received within the conduit 777. In this manner, the flexibility of each of these cables may permit the redistribution connector 775 to be placed in a storage pocket outside of and separated from the IGU 811.

Figure 7A:
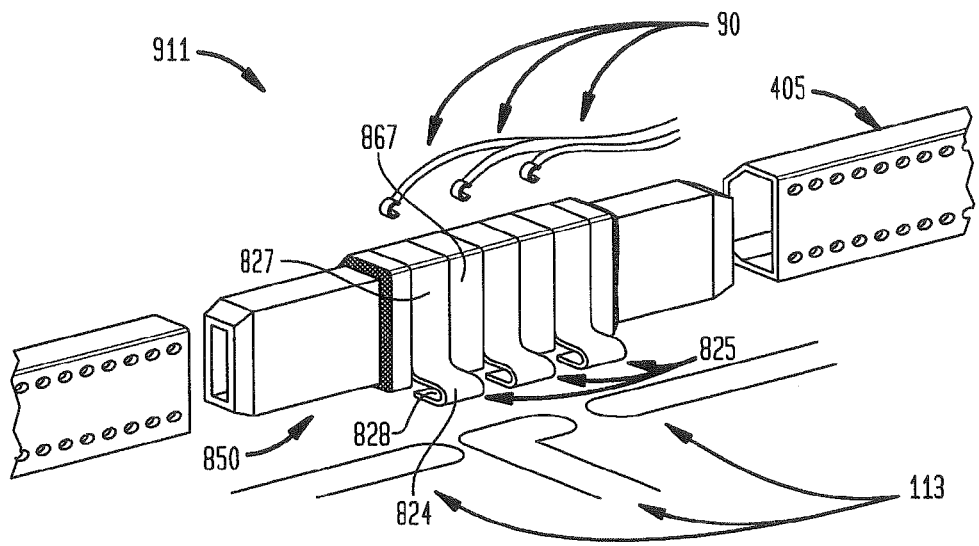
FIGS. 7A and 7B are perspective and side cross-cross-sectional views of portions of IGUs having electrical feed-through interconnections around a spacer key and a spacer frame, respectively, of the IGUs in accordance with some embodiments.

Referring now to FIG. 7A, in an embodiment, an IGU 911 may include a spacer key 850 that may be inserted within a spacer 405 and a plurality of conductive coils 825 having a tab 828 for attachment to the respective busbars 113, such as by but not limited to being by soldering. Each of the conductive coils 825 may include a winding section 824 that may curl from the respective busbar 113 in a direction of the spacer key 850 until the respective winding sections 824 contact the spacer key 850. As shown, in some arrangements, inner sections 827 of the respective conductive coils 825 may extend along and an inner surface 867 of the spacer key 850. As further shown, the respective conductive coils 825 may extend around a surface of the spacer key 850 against which the spacer seal 14 (shown in the alternative arrangement of FIG. 7B) may be placed. Although not shown in FIG. 7A, the conductive coils 825 may further extend along an outer surface of the spacer key 850 opposite the inner surface 867, as suggested in FIG. 7B.

Figure 7B:
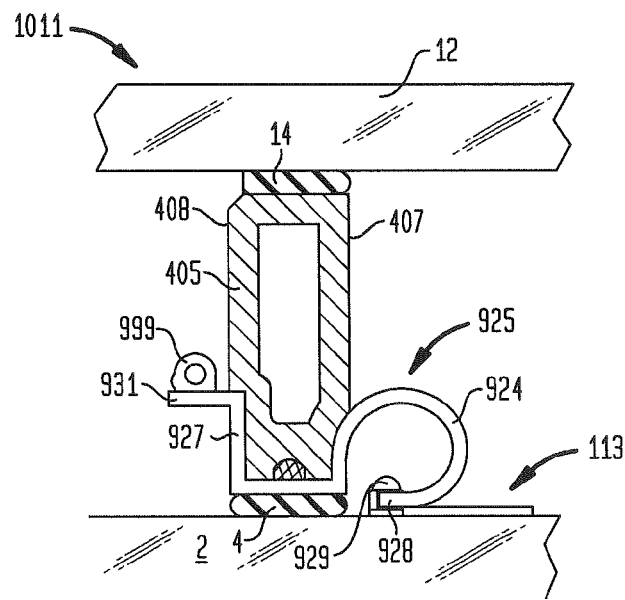

As illustrated in FIG. 7B, in an alternative arrangement, an IGU 1011 may include a conductive coil 925 that may pass through a space between the spacer seal 4 and the spacer 405 in which the spacer seal 4 may be located along the glass panel 2. As shown in FIG. 7B, the conductive coil 925 may include a tab 928 that may be attached to the busbar 113. As shown in this arrangement, the conductive coil 925 may be attached to the glass panel 2 through the busbar 113 by a fastener 929, such as by but not limited to being by a screw or a nail. In this manner, the conductive coil 925 may be electrically connected to the busbar 113. The conductive coil 925 may further include a winding section 924 that may curl from the busbar 113 in the direction of the spacer 405 until the winding section 924 may become flush against a portion of the inner surface 407 of the spacer 405 adjacent the spacer seal 4. After insertion through the space defined between the spacer seal 4 and the spacer 405, an outer section 927 of the conductive coil 925 may extend along an outer surface 408 of the spacer 405 and then may curve away from the spacer 405 to provide a shelf 931 for interconnection with a conductive component 999, as shown in FIG. 7B. Such a conductive component may be but is not limited to being a spring or other type of conductive component such as those described previously herein. In some arrangements, such a spring may be made of stainless steel or other electrically conductive materials. In some arrangements, such a spring may be a coiled spring or a leaf spring. In some arrangements, conductive component may be plated to improve electrical conductivity.

Figure 8A:
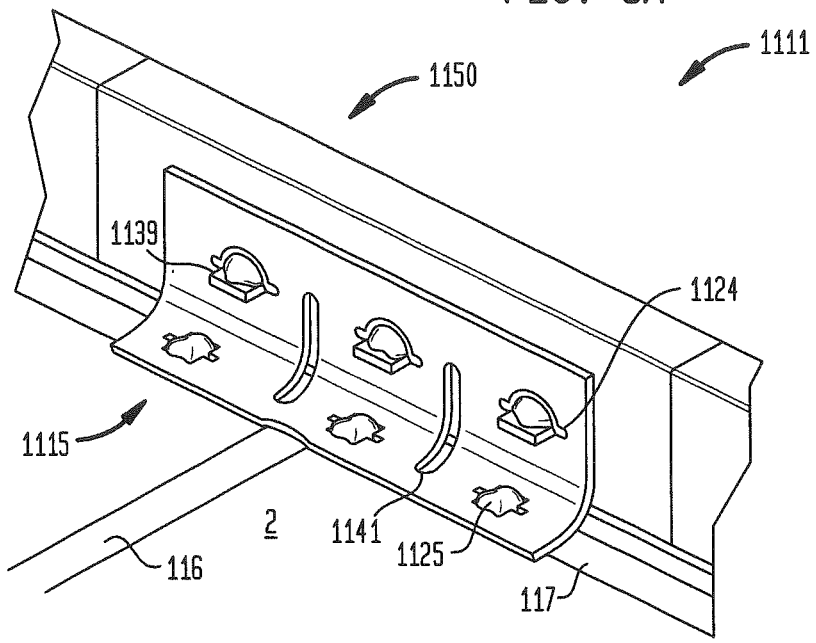
FIGS. 8A and 8B are perspective views of portions of IGUs having electrical feed-through interconnections through respective spacer keys of the IGUs in accordance with some embodiments.

Referring now to FIG. 8A, an IGU 1111 may include a spacer key 1150 having conductive plates 1139 extending through a width of the spacer key 1150. In this example, traces (not shown) within a flexible printed circuit ribbon 1115 may contact respective ones of the plates 1139 on one end of the traces and respective busbars 116, 117 on the other end of the traces. The flexible printed circuit ribbon 1115 may include opposing sets of first and second openings 1124, 1125 defined by the ribbon 1115. As shown, in some arrangements, each of the first openings 1124 may be dimensioned to receive a respective one of the plates 1139, and in some arrangements, each of the second openings 1125 may act as a solder mask permitting a soldered connection only through the respective second openings 1125. As further shown, in some arrangements, any of the openings 1124, 1125 may have but are not limited to having a profile shape of a cross.

In some arrangements, the printed circuit ribbon 1115 may include slots 1141 which may provide stress relief to the ribbon 1115 during relative movement of any of the aforementioned features attached to the ribbon 1115. In some arrangements, the printed circuit ribbon 1115 may be flexible such that the ribbon 1115 may bend to conform to the glass lite panel 2 and may bend to conform to an inner surface of the spacer key 1150.

Figure 8B:
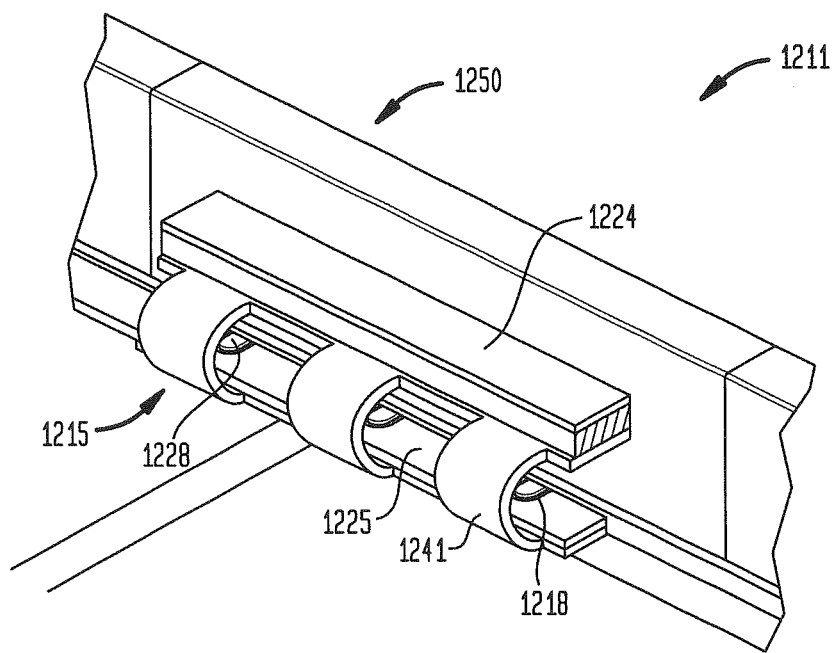

In another example as shown in FIG. 8B, an IGU 1211 may include a spacer key 1250 and a flexible printed circuit 1215. The spacer key may have conductive components (not shown), such as but not limited to pins, pads, or plates, that may extend through the spacer key 1250 and that may be connected to respective receptacles (not shown) of a first connector head 1224 on one end of the flexible printed circuit 1215. As shown, an opposite end of the flexible printed circuit 1215 may have a second connector head 1225 that may be attached to the first connector head 1224 by a series of ribbons 1241. The second connector head 1225 may include conductive grooves 1218 defined by a tip of the connector head 1225.

Pin pads 1228 may be attached to respective ones of the busbars 116, 117 within an IGU cavity of the IGU 1211, such as by, but not limited to being by, soldering. The pin pads 1228 may have a shaft separated by opposing heads (not shown), e.g., in the form of a dumbbell, or as shown a shaft and a head. The respective heads of the pin pads 1228 may be separated a distance such that the grooves 1218 of the second connector head 1225 may be inserted in a compression fit around the shaft of the pin pads 1228 to attach the second connector head 1225 to the pin pads 1228. In this manner, any of the busbars 116, 117 within the IGU cavity may be electrically interconnected to the conductive components extending through the spacer key 1250 as well as to any corresponding conductive components that may be electrically interconnected with the conductive components extending through the spacer key 1250. As shown, the ribbons 1241 may be spaced apart to provide stress relief in a similar manner as the slots 1141 of the IGU 1111 described previously herein when the printed circuit ribbon 1215 is attached to the spacer key 1250 and the pin pads 1228.

Figure 9A:
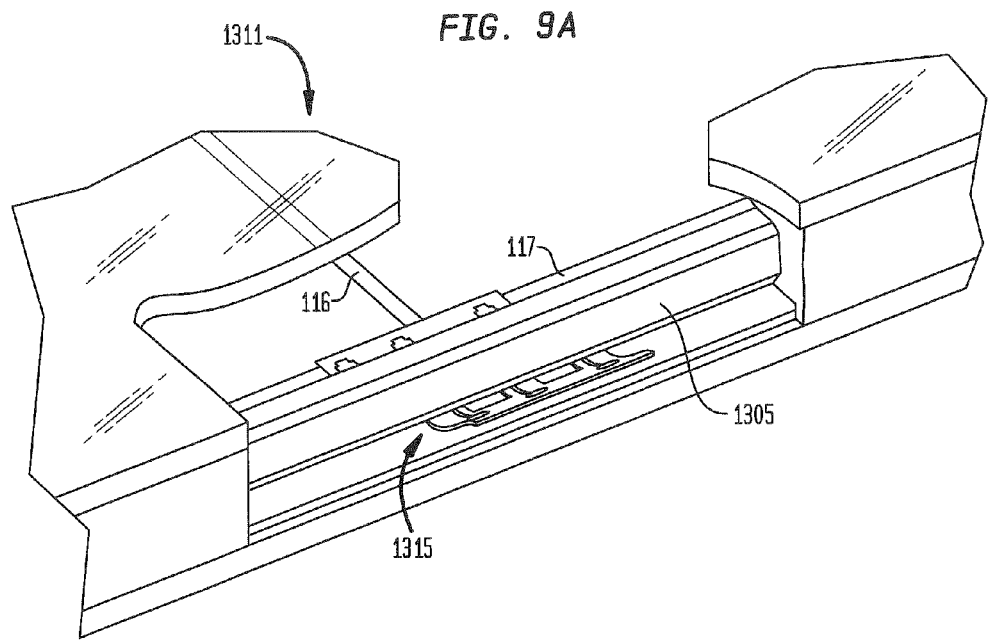
FIGS. 9A and 9B are cutaway perspective and side cross-sectional views of portions of an IGU having electrical feed-through interconnections around a spacer frame of the IGU in accordance with an embodiment.
Figure 9B:
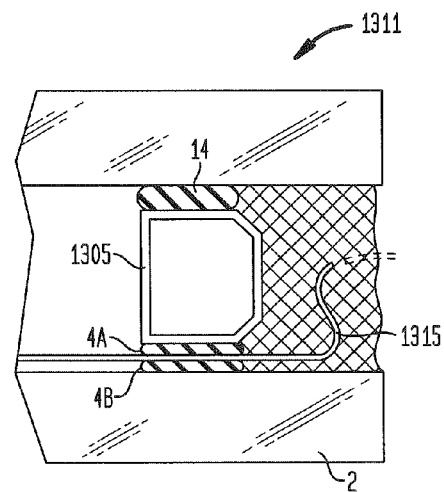

Referring now to FIGS. 9A and 9B, an IGU 1311 may include a spacer 1305 between spacer seals 4A and 14. As shown, a flexible printed circuit 1315 that may be substantially similar to the flexible printed circuit 1115 shown in FIG. 8A may be attached such as by but not limited to being by soldering, to any of inner and outer busbars 116, 117 within an IGU cavity, defined by an inner perimeter of the spacer 1305, on one end of the printed circuit 1315. In this example, traces within the flexible printed circuit may be aligned with the respective busbars 116, 117 for electrical interconnection between the busbars 116, 117 and the traces. As best shown in FIG. 9B, the flexible printed circuit 1315 may pass between the spacer seal 4A and an adjacent ribbon seal 4B in which the spacer seal 4A and the ribbon seal 4B both extend between the spacer 1305 and the glass lite panel 2. In this manner, the flexible printed circuit 1315 may permit electrical interconnection from the busbars 116, 117 to electrical components outside of the IGU cavity. In some arrangements, spacer seal 4A and the ribbon seal 4B may be any of elastomeric seals, adhesive sealants, or rigid bonding materials such as those described herein.

Figure 9C:
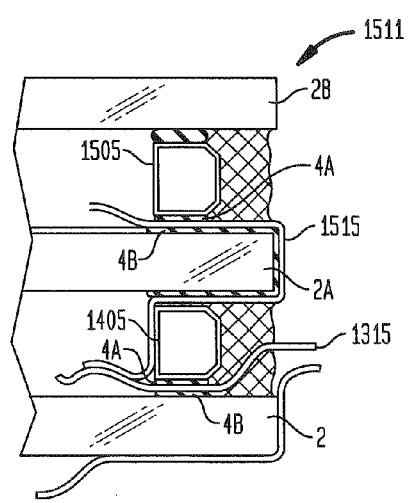
FIG. 9C is a side cross-sectional view of a portion of an IGU having electrical feed-through interconnections around and between multiple spacer frames of the IGU in accordance with an embodiment.

In the example shown in FIG. 9C, an IGU 1511 may include a central glass lite panel 2A that may be separated by respective spacers 1405, 1505 from outer glass lite panels 2 and 2B. As illustrated, a flexible printed circuit 1515 may pass between IGU cavities defined by inner perimeters of the spacers 1405, 1505. As shown, the flexible printed circuit 1515 may be sealed on both ends by a spacer seal 4A and an adjacent ribbon seal 4B in the same manner as described previously herein with respect to the flexible printed circuit 1315, as best shown in FIG. 9B. In this manner, busbars or other electrically conductive components located within the IGU cavities defined by the respective spacers 1405, 1505 may be electrically interconnected.

In alternative arrangements, other types of electrical connectors may be passed through between a spacer and a glass lite panel, such as but not limited to flat ribbon cables, individual insulated wires, and various connections around and through IGUs as described in U.S. patent application Ser. No. 13/610,143, the entire disclosure of which is hereby incorporated by reference herein in its entirety.

During the process of assembling an IGU, in accordance with another embodiment, various processes may be employed to provide accessibility to contacts providing electrical interconnections through a spacer or spacer key that may be located at or below the surface of the PIB secondary seal. In some arrangements, a mask, which may be but is not limited to being a clear polymer, a folded paper, or a temporary tack tape may be applied or placed over such contacts during automated secondary seal fill. In this manner, the mask may be removed after the seal fill to expose the contacts for physical connection with other components, resulting in configurations such as are shown in any of FIGS. 2K, 6A, and 6B. In such arrangements, after physical connections with other components are made, a second, typically manual, secondary seal fill may be conducted to fill the gap of the secondary seal fill left by the mask.

In other arrangements, such as those using a riser, the mask may conform to or be inserted into the outer surface of the riser in which the outer surface of the riser may extend at or near an outer surface of the secondary seal fill after the automated seal fill. In this manner, the mask may be removed from the outer surface of the riser to expose the contacts extending within the riser without having to perform a manual seal fill. In such configurations, the mask typically may have a flat profile to allow machines performing the seal fill to pass over the mask. In some arrangements, such a mask may be a disposable peal-away poly skin seal. In some arrangements, the mask may be a polymer having legs that may rest on the glass lite panel. In some arrangements, the mask may have a flexible portion extending at an angle from secondary seal fill such that it protrudes from the secondary seal fill.

It is to be noted that any the structures discussed previously herein for interconnections between busbars within an IGU cavity and conductive components external to the IGU cavity may be used in conjunction with any portion of an IGU spacer frame, including conductive portions or insulative portions, such as a spacer key. Other arrangements of interconnections are also contemplated in accordance with the disclosure set forth herein, such as the interconnections through spacer keys as disclosed in PCT Publication No. WO 2012/171844 A1, which is hereby incorporated by reference herein in its entirety.

Although some aspects, embodiments, and arrangements described previously herein have been described as having male and female interfaces, it is to be understood that such aspects, embodiments, and arrangements include the reversal of such male and female interfaces. For example, any male-female interconnections or other interconnections in which a pin or other electrical contact is inserted into another electrical contact may be reversed such that the male contact as described herein is a female contact and the female contact as described herein is a male contact.

Although some aspects, embodiments, and arrangements described previously herein have been described as having seals, sealants, sealing mechanisms, and the like, it is to be understood that such aspects, embodiments, and arrangements may include all, some, or none of such seals, sealants, sealing mechanisms, and the like. It is to be understood that any gaps at the interfaces of any components may be sealed by seals, sealants such as those described previously herein with respect to FIG. 3A, sealing mechanisms, and the like, including but not limited to gaskets, o-rings, silicone, polyisobutylene, and any other sealing mechanisms known to those of ordinary skill for use in each particular application. Although some aspects, embodiments, and arrangements described previously herein have been described as having one or a plurality of feed-through mechanisms, assemblies, connectors, and the like, it is to be understood that such aspects, embodiments, and arrangements may include either one or a plurality of such feed-through mechanisms, assemblies, connectors, and the like.

It is to be understood that the disclosure set forth herein includes all possible combinations of the particular features set forth above, whether specifically disclosed herein or not. For example, where a particular feature is disclosed in the context of a particular aspect, arrangement, configuration, or embodiment, or a particular claim, that feature can also be used, to the extent possible, in combination with and/or in the context of other particular aspects, arrangements, configurations, and embodiments of the invention, and in the invention generally.

Furthermore, although the invention herein has been described with reference to particular features, it is to be understood that these features are merely illustrative of the principles and applications of the present invention. It is therefore to be understood that numerous modifications, including changes in the sizes of the various features described herein, may be made to the illustrative embodiments and that other arrangements may be devised without departing from the spirit and scope of the present invention. In this regard, the present invention encompasses numerous additional features in addition to those specific features set forth in the claims below. Moreover, the foregoing disclosure should be taken by way of illustration rather than by way of limitation as the present invention is defined by the claims set forth below.

The invention claimed is:

1. An insulated glazing unit comprising:
   a spacer frame separating a pair of substrates and having a length and a width transverse to the length;
   at least one conductive element passing through the width of the spacer frame;
   at least one first conductive component within the spacer frame in electrical communication with the at least one conductive element;
   a second conductive component on a side of the spacer frame opposite the first conductive component and in electrical communication with the at least one conductive element; and
   an insulative tube extending at elast partially across the width of the space frame, the insulative tube at least partially surrounding the at least one conductive element.

2. The insulated glazing unit of claim 1, wherein the first conductive component is a conductive coil.

3. The insulated glazing unit of claim 2, wherein the conductive coil curls in both clockwise and counterclockwise directions.

4. The insulated glazing unit of claim 2, wherein the conductive coil curls within a plane parallel or perpendicular to the length of the spacer frame.

5. The insulated glazing unit of claim 2, wherein the at least one conductive element is a first pin, and wherein the conductive coil is a spring attached at a first end to the first pin, the conductive coil being in electrical communication with a busbar within a perimeter of the spacer frame.

6. The insulated glazing unit of claim 5, further comprising: a second pin having a head; and a pad extending from the spacer frame within the perimeter of the spacer frame and having a receiving hole, wherein the second pin extends from the busbar through the receiving hole of the pad, and wherein the spring is coiled around the second pin to aid in maintaining a shape and a position of the spring.

7. The insulated glazing unit of claim 1, wherein the first conductive component is soldered to a busbar within a perimeter of the spacer frame.

8. The insulated glazing unit of claim 1, wherein the insulative tube is molded.

9. The insulated glazing unit of claim 1, wherein a cover at least partially encloses one of the conductive element and the first conductive component, the cover being within a perimeter of the spacer frame.

10. The insulated glazing unit of claim 1, wherein the spacer frame includes a spacer and an insulative element separating the pair of substrates, the insulative element separating conductive spacer ends of the spacer.

11. A system for providing an electrical interface across a sealed boundary of an insulated glazing unit comprising:
    a spacer frame having a length and a thickness transverse to the length, the thickness separating a pair of substrates along the length thereof and forming a portion of the sealed boundary, the spacer frame further having a width transverse to the length, wherein the space frame includes a spacer and an insulative element separating the pair of substrates, the insulative element separating conductive spacer ends of the spacer;
    at least one conductive element passing through the sealed boundary; and
    first and second conductive components on opposing sides of the width of the spacer frame, each conductive element being in electrical communication with either of the first and second conductive components.

12. The system of claim 11, wherein the conductive element passes through the spacer frame.

13. The system of claim 11, wherein the conductive element passes between the spacer frame and at least one of the pair of substrates.

14. The system of claim 13, the sealed boundary including at least one seal separating the spacer frame from one of the pair of substrates, wherein the conductive element passes through one of (i) the at least one seal, (ii) a space between the at least one seal and the spacer frame, and (iii) a space between the at least one seal and the one of the pair of substrates.

15. The system of claim 13, wherein the conductive element is a metallic band conforming to at least a wall of the spacer frame defining at least a portion of the width of the spacer frame.

16. The system of claim 13, wherein the conductive element is a flexible cable ribbon.

17. The system of claim 11, wherein the first conductive component is soldered to a busbar within a perimeter of the spacer frame.

18. A method for providing an electrical interface across a sealed boundary of an insulated glazing unit comprising the steps of:
    receiving at least one conductive element through the sealed boundary of an insulated glazing unit, the insulated glazing unit including a spacer frame having a length and a thickness transverse to the length, the thickness separating a pair of substrates along the length thereof and forming a portion of the sealed boundary, the spacer frame further having a width transverse to the length, wherein the spacer frame includes a spacer and an insulative element separating the pair of substrates, the insulative element separating conductive spacer ends of the spacer, and wherein the at least one conductive element is passed at least partially through the insulative element; and
    receiving electrical current through the at least one conductive element at either of first and second conductive components on opposing sides of the width of the spacer frame.

19. The method of claim 18, wherein the insulated glazing unit further includes at least one seal separating the spacer frame from one of the pair of substrates, the at least one seal forming an additional portion of the sealed boundary, and wherein, during the receiving step, the conductive element is passed through the at least one conductive element through any of (i) the spacer frame, (ii) the at least one seal, (iii) a space between the at least one seal and the spacer frame, and (iv) a space between the at least one seal and the one of the pair of substrates.

* * * * *

UNITED STATES PATENT AND TRADEMARK OFFICE
CERTIFICATE OF CORRECTION

| | | |
|---|---|---|
| PATENT NO. | : 9,142,945 B2 | |
| APPLICATION NO. | : 13/910911 | |
| DATED | : September 22, 2015 | |
| INVENTOR(S) | : Snyker et al. | |

It is certified that error appears in the above-identified patent and that said Letters Patent is hereby corrected as shown below:

In the Claims
Column 25, line 11, please delete "frame in" and insert --frame and in--
Column 25, line 17, please delete "elast" and insert --least--
Column 25, line 18, please delete "space" and insert --spacer--
Column 25, line 60, please delete "space" and insert --spacer--

Signed and Sealed this
Nineteenth Day of April, 2016

Michelle K. Lee
*Director of the United States Patent and Trademark Office*